United States Patent
Ezra et al.

(10) Patent No.: US 11,411,856 B2
(45) Date of Patent: *Aug. 9, 2022

(54) SYSTEMS AND METHODS FOR CONFIGURING A COMMUNICATIONS NETWORK

(71) Applicant: ECI Telecom Ltd., Petah Tikva (IL)

(72) Inventors: Shirel Ezra, Ganei Tal (IL); Inbal Hecht, Petah Tikva (IL); Efraim Gelman, Ramat Gan (IL)

(73) Assignee: ECI Telecom Ltd., Petah Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/248,452

(22) Filed: Jan. 25, 2021

(65) Prior Publication Data

US 2022/0014461 A1    Jan. 13, 2022

Related U.S. Application Data

(63) Continuation of application No. 16/946,846, filed on Jul. 8, 2020, now Pat. No. 10,904,131.

(51) Int. Cl.
*H04L 45/12* (2022.01)
*H04L 45/02* (2022.01)
*H04L 45/16* (2022.01)

(52) U.S. Cl.
CPC .......... *H04L 45/123* (2013.01); *H04L 45/02* (2013.01); *H04L 45/127* (2013.01); *H04L 45/16* (2013.01)

(58) Field of Classification Search
CPC ... H04L 45/123; H04L 45/124; H04L 45/127; H04L 45/128; H04L 45/10; H04L 45/12;

(Continued)

(56) References Cited

U.S. PATENT DOCUMENTS 6,721,270 B1 * 4/2004 Mitra .............. H04L 49/25
                                               709/224
7,787,769 B1   8/2010 Slezak et al.
(Continued)

FOREIGN PATENT DOCUMENTS

CN    108 880 910 A    11/2018
EP     0 637 153 A1     2/1995
WO    WO 98/09403 A2    3/1998

*Primary Examiner* — Phong La
(74) *Attorney, Agent, or Firm* — Finnegan, Henderson, Farabow, Garrett & Dunner, LLP

(57) ABSTRACT

Systems and methods are disclosed for configuring a communications network. In disclosed embodiments, a set of permissible service link decompositions and a set of basic service links may be obtained for the communications network. A spanning subset of service links for the communications may be generated. Generation of the spanning subset may include selecting a decomposition of a first service link from a set of permissible service link decompositions; updating the set of permissible service link decompositions based on the selected decomposition; and updating the set of basic service links using the updated set of permissible service link decompositions. In some embodiments, obtaining the set of permissible service link decompositions can include generating a set of permissible service link decompositions by traversing decomposition graphs generated for each of the service links. In some embodiments, the communications network can be configured to satisfy network demands using the spanning subset.

18 Claims, 9 Drawing Sheets

(58) Field of Classification Search
CPC ......... H04L 45/14; H04L 45/16; H04L 45/18;
H04L 45/22; H04L 45/24; H04L 45/02;
H04L 41/12; H04L 12/18
See application file for complete search history.

(56) References Cited

U.S. PATENT DOCUMENTS

| | | | |
|---|---|---|---|
| 8,265,061 | B1 | 9/2012 | Smith et al. |
| 8,953,500 | B1 | 2/2015 | Shen et al. |
| 2009/0060079 | A1* | 3/2009 | Choi ................. H04L 25/03203 375/265 |
| 2009/0097418 | A1* | 4/2009 | Castillo .................. H04L 41/12 370/255 |
| 2009/0296719 | A1 | 12/2009 | Maier et al. |
| 2013/0191688 | A1 | 7/2013 | Agarwal et al. |
| 2013/0315580 | A1 | 11/2013 | Boertjes et al. |
| 2014/0143419 | A1* | 5/2014 | Vyatkin ............. H02J 13/00002 709/224 |
| 2014/0236415 | A1 | 8/2014 | Foiret |
| 2014/0335480 | A1 | 11/2014 | Asenjo et al. |
| 2015/0200838 | A1 | 7/2015 | Nadeau et al. |
| 2015/0304069 | A1* | 10/2015 | Wu ....................... H04L 1/0054 375/341 |
| 2015/0304209 | A1 | 10/2015 | Choudhury et al. |
| 2017/0078922 | A1* | 3/2017 | Raleigh ................. H04W 28/10 |
| 2019/0318421 | A1 | 10/2019 | Lyonnet et al. |

* cited by examiner

Length:
$l(e_1) = 800$
$l(e_2) = 700$
$l(e_3) = 400$
$l(e_4) = 300$

Transceiver Data:
$TD_1$ = (Capacity = 200, Length = 800, Weight = 17)
$TD_2$ = (Capacity = 100, Length = 1500, Weight = 13)

Demands:
$d_1 = 50$
$d_2 = 50$
$d_3 = 60$

Exemplary Service Link Sets:
$SLS_1 = \{S_3, S_4, S_2\}$
$SLS_2 = \{S_1, S_2, S_{11}, S_{12}\}$

SYSTEMS AND METHODS FOR CONFIGURING A COMMUNICATIONS NETWORK

RELATED APPLICATION

This application is a continuation of U.S. application Ser. No. 16/946,846, filed on Jul. 8, 2020, the entirety of which is incorporated herein by reference.

BACKGROUND

Communications networks, such as optical communications networks, can be represented by nodes, each corresponding to one or more signal handling devices, connected by edges, corresponding to one or more signal pathways. Service links can be created to satisfy demands on the communications network. Such service links may have different transceiver data types (e.g., depending on the signal handling device(s) used to implement the service link). Multiple sets of service links may be able to satisfy the demands on the network. The service links in these differing sets may differ in terms of number, transceiver data type, or pathway. Therefore, selection of a set of service links to satisfy the demands on a network may implicate considerations of utilization, quality, lifespan or maintenance, cost, or the like.

SUMMARY

The disclosed systems and methods can be used to configure a communications network. The communications network can be configured to implement service links that satisfy demands on the communications network. Disclosed embodiments can be used to determine low-weight sets of service links (where weights can represent utilization, quality, lifespan or maintenance, cost, or other such considerations) or spanning sets of service links capable of satisfying the demands on the network.

The disclosed embodiments include a method for determining a spanning subset of service links for a communications network. The method can include obtaining a set of permissible service link decompositions for the communications network and a set of basic service links for the communications network. The method can further include generating the spanning subset. Generating the spanning subset can including selecting a decomposition of a first service link from the set of permissible service link decompositions. Generating the spanning subset can further include updating the set of permissible service link decompositions based on the selected decomposition. Generating the spanning subset can also include updating the set of basic service links using the updated set of permissible service link decompositions.

The disclosed embodiments include a method for configuring a communications network. The method can include obtaining a set of permissible decompositions of a set of service links for the communications network. The method can further include iteratively determining a spanning subset of the set of service links. An iteration of the determination of the spanning subset can include updating the spanning subset of the set of service links based on the set of permissible service link decompositions. An iteration can further include updating the set of permissible service link decompositions based on the spanning subset. An iteration can also include selecting, from the set of permissible service link decompositions, a decomposition of a first service link. An iteration can further include updating the set of permissible service link decompositions using a first demand associated with the first service link. The method can also include configuring the communications network to transmit network traffic using the spanning subset of service links.

The disclosed embodiments include an additional method for configuring a communication network. The additional method includes determining a set of service links for a path in the communication network based on a set of demands for the path. The determination can include repeatedly selecting sets of service links for segments of the path. A repeat for a segment can include determining pair weights for path pairs. Each path pair can include an initial portion of the segment, the initial portion being associated with a first set of service links and a first weight dependent on the first set. Each path pair can also include a complementary portion of the segment, the complementary portion being associated with a second set of service links and a second weight dependent on the second set. The pair weight for the each path pair can depend on the first weight and the second weight. A repeat for a segment can further include selecting a path pair for the segment based on the pair weight for the selected path pair. A repeat for a segment can also include selecting the first and second sets of service links for the selected path pair as the set of service links for the segment. The determination of the set of service links can further include determining, when the segment comprises the path, the set of service links for the segment as the set of service links for the path. The method can further include configuring the communication network to service the set of demands for the path using the selected set of service links for the path.

The disclosed embodiments include a method for determining a configuration of a communication network. The method can include obtaining, for a communication network comprising fiber optic cables connected by switches and transceiver-transponders, a representation of the communication network as a set of edges representing the fiber optic cables, the edges connected by nodes representing the switches and transceiver-transponders. The method can further include determining a set of service links for a path in the communication network based on a set of demands for the path, each service link representing data transmission by one of the transceiver-transponders through one or more of the fiber optic cables connected by zero or more of the switches. The determination of the set of service links can include iteratively selecting sets of service links for progressively longer initial segments of the path. An iteration for an initial segment can include determining pair weights for path pairs. Each path pair can include an initial portion of the initial segment, the initial portion being associated with a first set of service links and a first weight dependent on the first set. Each path pair can also include a complementary portion of the initial segment, the complementary portion being associated with a second set of service links and a second weight dependent on the second set. The pair weight for the each path pair can depend on the first weight and the second weight. An iteration for an initial segment can further include selecting a path pair for the initial segment based on the pair weight for the selected path pair. An iteration for an initial segment can also include selecting the first and second sets of service links for the selected path pair as the set of service links for the initial segment. The determination of a set of service links can further include determining, when the initial segment comprises the path, the set of service links for the initial segment as the set of service links for the path.

The disclosed embodiments include a method for determining a spanning set of service links for a communications network. The method can include obtaining a set of service links for a cycle graph representing a communications network. The set of service links can include a first subset of first service links, each of the first service links traversing at most a first number of edges in the cycle graph and associated with one of first demands having a first demand capacity. The set of service links can include a second subset of second service links, each of the second service links traversing at most a second number of edges in the cycle graph and associated with one of second demands having a second demand capacity. The set of service links can include a third subset of third service links, each of the third service links traversing at least a third number of edges in the cycle graph and associated with one of third demands having a third demand capacity. A first capacity bound of the first service links can be greater than or equal to the sum of the first demand capacity and two times the second demand capacity. The first capacity bound of the first service links can be greater than or equal to the sum of the first demand capacity and the third demand capacity. The first capacity bound of the first service links can be less than the sum of the first demand capacity, the second demand capacity and the third demand capacity. The method further comprises determining a spanning subset of the service links containing the first and second service links. The method also comprises configuring the communications network to satisfy the first, second, and third demands using the spanning subset of the service links.

The disclosed embodiments include an additional method for determining a spanning set of service links for a communications network. The method can include obtaining a graph including a first number of edges, the graph representing the communications network. The method can further include obtaining transceiver data types. The transceiver data types can include a first transceiver data type with a first weight. A service link configured to use the first transceiver data type can be capable of spanning one edge of the graph and satisfying a set of demands on the communications network. The transceiver data types can include a second transceiver data type with a second weight. A service link configured to use the second transceiver data type can be capable of spanning two edges of the graph and satisfying at most some of the demands in the set of demands. The transceiver data types can include a third transceiver data type with a third weight. A service link configured to use the third transceiver data type can be capable of spanning three edges of the graph and satisfying one of the demands in the set of demands. The method can also include selecting, based on the first weight, second weight, third weight, and first number of edges, service links that satisfy the demands. The selected service links can include a first number of service links having the second transceiver data type, the first number of service links equal to the first number of edges; a service link having the first transceiver data type and a second number of service links having the second transceiver data type, the second number of service links equal to the first number of edges minus one; four service links having the third transceiver data type and a third number of service links having the second transceiver data type, the third number of service links equal to the first number of edges minus three; a fourth number of service links having the third transceiver data type, the fourth number of service links equal to four thirds times the first number of edges; a service link having the first transceiver data type and a fifth number of service links having the third transceiver data type, the fifth number of service links equal to four thirds times the first number of edges minus one; or two service links having the second transceiver data type and a sixth number of service links having the third transceiver data type, the sixth number of service links equal to four thirds times the first number of edges minus two. The method can further include configuring the communications network to satisfy the set of demands using the determined service links.

It is to be understood that both the foregoing general description and the following detailed description are exemplary and explanatory only and are not restrictive of the disclosed embodiments, as claimed.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. For example, unless otherwise indicated, method steps disclosed in the figures can be rearranged, combined, or divided without departing from the envisioned embodiments. Similarly, additional steps may be added or steps may be removed without departing from the envisioned embodiments. Thus, the materials, methods, and examples are illustrative only and are not intended to be necessarily limiting.

Communications networks can be implemented using signal handling devices to transmit data along signal pathways. The communications networks can be associated with sets of demands and can be configurable to satisfy these sets of demands. A communications network may be configurable to satisfy a set of demands in multiple different ways. Different configurations may use different signal handling devices or signal pathways. Selection of a network configuration may therefore implicate considerations of utilization, quality, lifespan or maintenance, cost, or the like. Determination of an appropriate configuration may be difficult, because of the large number of signal handling devices, demands, and signal pathways in the communications network.

The disclosed embodiments can enable the determination of network configurations with favorable characteristics. Certain disclosed embodiments can enable selection of lower-weight sets of service links that satisfy demands over a path on a communications network. In such embodiments, the weights can represent characteristics of interest, such as utilization, quality, lifespan or maintenance, cost, or the like. Accordingly, such embodiments can improve the quality, efficiency, or other characteristics of a communications network. Additionally or alternatively, given a set of service links and an associated set of demands, certain disclosed embodiments can enable determination of a subset of the service links capable of satisfying the demands. Accordingly, such embodiments can reduce the number of service links necessary to satisfy the demands, improving the efficiency and flexibility of the communications network.

Path Generation

Figure 1:
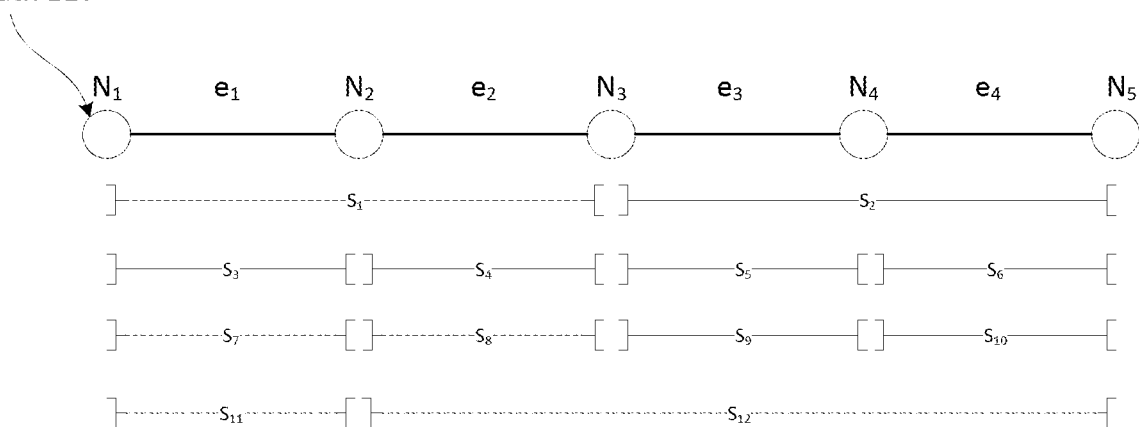
FIG. 1 depicts an exemplary schematic of an exemplary communication network including a set of service links, consistent with disclosed embodiments.

FIG. 1 depicts a schematic of an exemplary communication network 100 including a set of service links, consistent with disclosed embodiments. Communication network 100 can be an optical communication network (e.g., a fiber optic network), an electrical communication network (e.g., an ethernet or PSTN network), or a hybrid network including optical and electrical components. A schematic representation of communication network 100 can include nodes (e.g., $N_1$ to $N_5$) and edges (e.g., $e_1$ to $e_4$). Each node can represent one or more signal-handling devices, such as switches (e.g., ethernet or optical switches), routers, transceivers, transponders, or the like. Each node may or may not include geographically co-located signal-handling devices. Each edge can represent one or more signal pathways (e.g., a fiber optic cable for optical signals, metal cable for electrical signals, or the like) connecting or potentially connecting two nodes. An edge can represent multiple signal pathways. For example, an edge can represent a multimode optical fiber, a single-mode optical fiber, and a copper cable, all connecting or potentially connecting two nodes. In this example, the single-mode fiber and multi-mode fibers may originate and terminate at the same or different optical transceivers/transponders or switches, while the copper cable may originate or terminate in an electrical transceiver/transponder or switch (e.g., a telephone repeater, exchange, or the like). Accordingly, the schematic representation of the communications network can be a graph, with the nodes as vertices connected by the edges. In some embodiments, the graph can be a cycle graph (e.g., some number of vertices connected in a closed chain).

Consistent with disclosed embodiments, the elements of communication network 100 can be associated with network parameters. In some embodiments, an edge connecting two vertices can be associated with at least one value of at least one metric. This metric value can be or depend upon a characteristic of a signal pathway connecting or potentially connecting the two nodes. In some embodiments, the metric value can be or depend upon a physical length of the signal pathway connecting or potentially connecting the two nodes. For example, when the signal pathway is an optical fiber, the length can be a physical length (e.g., kilometers, miles, or the like) of the optical fiber, or a scaled physical length reflecting the quality or other transmission characteristics of the optical fiber. Other possible metrics include signal-to-noise ratio (e.g., an optical signal-to-noise ratio (ONSR) or the like), attenuation, or similar signal pathways characteristics. The disclosed embodiments are not limited to any particular measure of the metric value and the descriptions provided herein use unitless numbers for convenience of explanation. Furthermore, for convenience of explanation, the description provided herein refers to length as the exemplary metric. However, the disclosed embodiments should be understood to be generally applicable to any such metric. In various embodiments, the communications network can be associated with one or more transceiver data types. For example, one or more nodes of the communications network can be associated with a transceiver data type. In some instances, a transceiver data type can be associated with a transceiver-transponder or switch at a node. The transceiver data type can describe aspects of the signal-handling capabilities of the transceiver-transponder or switch. In some instances, a transceiver data type for a transceiver-transponder can indicate a capacity bound of transceiver-transponder or switch (e.g., a bound on bit rate, baud, bandwidth, or the like). The disclosed embodiments are not limited to any particular measure of capacity bound and the descriptions provided herein use unitless numbers for convenience of explanation. In various instances, a transceiver data type for a transceiver-transponder or switch can indicate a length bound for signal transmission using the transceiver-transponder or switch. The length bound can be a physical length or a scaled physical length accounting for characteristics of the transmission medium. The length bound can be a maximum length bound. In some instances, a transceiver data type can be associated with a weight. A weight can be based on at least one of utilization considerations (e.g., indicating a preference for less-used transceiver-transponders), quality considerations (e.g., indicating a preference for transceiver-transponders that provide a better signal quality), lifespan or maintenance considerations (e.g., indicating a preference for transceiver-transponders with a greater remaining lifespan or requiring less frequent maintenance), cost considerations (e.g., a cost associated with usage of a transceiver-transponder), or other such considerations.

Consistent with disclosed embodiments, a service link l can be a tuple including an edge and a transceiver data type:

$$l=(P,\text{TD})$$

In this example, P is a path on the network including one or more edges and TD is a transceiver data type. In some embodiments, the length of the path P can be the sum of the lengths associated with the edges. In various embodiments, the length of the path P must be less than the length bound of the transceiver data TD.

FIG. 1 provides examples of potential service links on network 100, consistent with disclosed embodiments. As shown, network 100 can include path 110 from node $N_1$ through node $N_5$ along edges $e_1$ to $e_4$. Each sub-path along path 110 can be associated with one or more potential service links. For example, the sub-path from $N_2$ to $N_3$ is associated with potential service links $S_4$ and $S_8$. The nodes of network 100 can each support at least one of two transceiver data types. In this non-limiting example, the first transceiver data $TD_1$ has a capacity bound of 200, a length bound of 800, and a weight of 17, while the second transceiver data $TD_2$ has a capacity bound of 100, a length bound of 1500, and a weight of 13. The two types of transceiver data can represent two different ways of conveying signals between nodes along path 110. For example, the first transceiver data type may correspond to using one type of optical modulation (e.g. PSK, or the like), while the second transceiver data type may correspond to using another, more-dense optical modulation (e.g. 256-QAM, or the like). To continue this example, more data can be provided a short distance using the dense modulation, while less data can be provided a longer distance with lesser BW using the less dense modulation (PSK).

In the non-limiting example depicted in FIG. 1, potential service links indicated with solid lines may use $TD_1$ (e.g., $S_2$-$S_6$, $S_9$, $S_{10}$), while potential service links indicated with dotted lines may use $TD_2$ (e.g., $S_1$, $S_7$, $S_8$, $S_{11}$, $S_{12}$). The potential service links associated with path 110 of communication network 100 may depend on the lengths associated with the edges (e.g., edge $e_1$ can be associated with a length of 800 and edge $e_4$ can be associated with a length of 300, as shown). For example, a service link $S_{12}$ can begin at node $N_2$ and end at node $N_5$ because the total length of this path (e.g., 1400–the sum of the lengths of edges $e_2$ to $e_4$) is less than the length bound for transceiver data $TD_2$ (e.g., 1500). A service link using transceiver data $TD_1$ and beginning at node $N_2$ and ending at node $N_5$ may not be possible, as the length bound for transceiver data $TD_l$ is only 800.

A set of demands can be associated with path 110 over network 100. Such demands can arise from user requests for streaming video, videoconferencing applications, web surfing, or the like. The disclosed embodiments are not limited to any particular demand type or demand origin. The set of demands can have an associated capacity (e.g., a bit rate, baud, bandwidth requirement, or the like). In some embodiments, the demand capacity can be a bound on the amount of resources that may be requested or used to service the demand. The disclosed embodiments are not limited to a particular measure of demand capacity and the descriptions provided herein use unitless numbers for convenience of explanation. In some embodiments, the demand capacity may depend on the type of demand (e.g., videoconferencing versus web surfing), a quality-of-service requirement associated with the demand, or the like. The disclosed embodiments are not limited to any particular type or origin of the demand capacity.

A set of services links SL can satisfy a set of demands D having capacities X on the path P when there exists an association between each demand d∈D and a list of service links L(d), such that:

$$L(d) = \{l_1^d, \ldots, l_{k(d)}^d\}, l_i^d \in SL$$

In some embodiments, concatenating the paths of the service links in L(d) results in the path P. In various embodiments, the sum of all demand capacities for all demands using each service link (e.g., all demands that include the service link in their associated lists of service links) is less than the capacity of that service link. For example:

$$cap(r) \geq \Sigma_{d:r \in L(d)} x_d, \forall l \in SL, \forall d \in$$

In this equation, the sum of all demand capacities x for each demand d including the service link l in its list of service links L(d) can be less than the capacity associated with the service link I.

Two exemplary sets of service links, $SLS_1$ and $SLS_2$, are depicted in FIG. 1. $SLS_1$ includes the service links $S_3$, $S_4$, and $S_2$. The concatenation of these service links is path 110. Each of these links has capacity 200, while the total sum of the demand capacities for each of these links is 160 (e.g., the sum of $D_1$, $D_2$, and $D_3$). $SLS_2$ includes the service links $S_1$, $S_2$, $S_{11}$, and $S_{12}$. The concatenation of the contiguous service links in $SLS_2$ (e.g., the concatenation of contiguous service links $S_1$ and $S_2$, and the concatenation of the contiguous service links $S_{11}$ and $S_{122}$) is also path 110. When demands $D_1$ and $D_2$ are associated with service links $S_1$ and $S_2$, demand $D_3$ can be associated with service links $S_{11}$ and $S_{12}$. When demands $D_1$ and $D_2$ are associated with service links $S_{11}$ and $S_{12}$, demand $D_3$ can be associated with service links $S_1$ and $S_2$. In either case, for each of service links $S_1$, $S_2$, $S_{11}$, and $S_{12}$, the total sum of demand capacities associated with the service link is less than the capacity of the service link.

While the sets of service links $SLS_1$ and $SLS_2$ both satisfy the demands $d_1$, $d_2$, and $d_3$, different total weights are associated with these two sets of service links. The total weight associated with $SLS_1$ is 51, while the total weight associated with $SLS_2$ is 59. Accordingly, $SLS_2$ has a higher weight than $SLS_1$. As the weights may represent utilization, quality, lifespan or maintenance, cost, or other considerations (or some combination thereof), communications network 100 may be configured to satisfy demands $d_1$, $d_2$, and $d_3$ by routing communications associated with these demands through the service links in $SLS_1$. For example, a controller of communications network 100 can configure one or more switches or transceiver-transponders at node $n_1$ to route traffic associated with demands $d_1$, $d_2$, and $d_3$ through service link $S_3$. The controller can configure one or more transceiver-transponders at node $N_2$ to route traffic associated with demands $d_1$, $d_2$, and $d_3$ through service link $S_4$. Finally, the controller can configure one or more switches or transceiver-transponders at node $N_3$ to route traffic associated with demands $d_1$, $d_2$, and $d_3$ through service link $S_2$. In this manner, the controller can configure the network to satisfy the demands $d_1$, $d_2$, and $d_3$ using a set of service links having lesser total weight.

Figure 2:
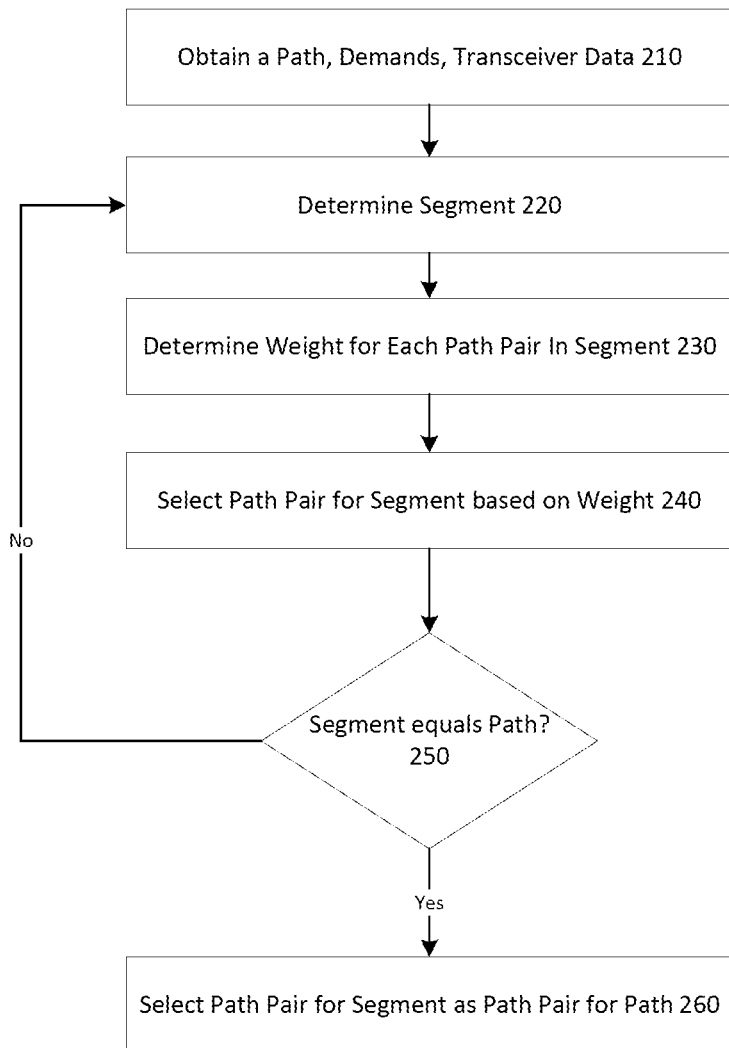
FIG. 2 depicts an exemplary method for selecting a set of service links that satisfy a set of demands over a path along a communication network, consistent with disclosed embodiments.

FIG. 2 depicts a method 200 for selecting a set of service links that satisfy a set of demands over a path along a communication network, consistent with disclosed embodiments. In some embodiments, communication network 100 can include fiber optic cables connected by switches and transceiver-transponders. In various embodiments, a service link can represent data transmission by one of the transceiver-transponders through one or more of the fiber optic cables connected by zero or more of the switches. Method 200 is not limited to optical networks, but can also be used for electronic and hybrid optical/electronic networks.

Method 200 can enable selection of a set of service links with lesser weights, without requiring a comprehensive evaluation of every potential arrangement of service links. While the explanatory example in FIG. 1 included five nodes and two sets of transmission data, a real-world example might include between 3 and 600 nodes (or more) and 2 to 20 different sets of transmission data (or more). In such a scenario, there may be twelve thousand (or more) potential service links. Accordingly, determining the set of service links having the minimal total weight may require an infeasible amount of time or computing resources.

Consistent with disclosed embodiments, method 200 can include determining a set of service links for the path. The computing device can determine the set of service links for the path by repeatedly or iteratively determining sets of service links for segments of the path. Determining the set of service links for a segment can include dividing the segment into a path pair including an initial sub-segment and a complementary sub-segment. The computing device can be configured to determine a division of the segment and to determine sets of service links for the initial sub-segment and a complementary sub-segment that minimize the total weight associated with the segment. In the next repeat or iteration, the segment can be extended to include an additional portion of the path. The computing device can then repeat the determination of a path pair having sets of service links that minimize the total weight associated with the segment.

In some embodiments, given a path P including edges $\{e_0, \ldots, e_{n-1}\}$ and subject to demands D, the computing device can determine weights $w(p_{i,j}, D)$ for sub-paths $p_{i,j} = (e_i, \ldots, e_j)$. Then the computing device can iteratively determine:

$$\overline{w}(p_{0,j}, D) = \min_{i \in \{1, \ldots, j-1\}} (\overline{w}(p_{0,i}, D) + w(p_{i+1,j}, D))$$

for $j = 1, \ldots, n-1$

Determining sets of service links for the sub-paths may be more computationally tractable than determining a set of service links for the overall path. The set of service links for the path can be the union of the sets of service links for the sub-paths. The total weight for the optimal set of service links for the overall path may then bounded above by the sum of the total weights for each sub-path. Accordingly, whether the weights reflect utilization, quality, lifespan or maintenance, cost, or other considerations (or some combination thereof), method 200 can be used to configure the network to better address these considerations. Thus, method 200 can be used to improve the operation of communications network 100.

In some embodiments, the computing device can perform method 200 repeatedly or periodically. For example, the computing device can perform method 200 upon expiration of an interval between 30 seconds and 5 minutes, or longer. In various embodiments, the computing device can perform method 200 in response to obtaining a request or new demand, a new type of transmission data, a new node, a change in weights, or the like. In some embodiments, the computing device can perform method 200 in response to a warning or error condition, such as exceeding the capacity of a service link, a decrease in a quality of service, or a similar condition.

In step 210 of method 200, a computing device associated with a communication network (e.g., communication network 100) can obtain a path, a set of demands, and one or more transceiver data types. In some embodiments, the computing device can receive a representation of the communication device as a set of edges representing fiber optic cables, the edges being connected by nodes representing the switches and transceiver-transponders. The path can be from an origin node in the representation of the communication network to a destination node in the representation of the communication network.

In some embodiments, the path, set of demands, and one or more transceiver data types can be obtained from the same source. For example, a network controller or gateway may provide the path, set of demands, and transceiver data type(s). In various embodiments, the path, set of demands, and transceiver data type(s) can be obtained from different sources. For example, the computing device can be configured with network information describing a topology of the network (e.g., nodes and edges, or the like). In some instances, the network information can specify potential transceiver data type(s) for each node of the network. The computing device can then receive demands and path information from one or more other computing devices (e.g., computing devices associated with individual users). For example, a computing device of a user may request a connection between two nodes in communication network 100. The request may indicate the nodes and a demand capacity associated with the connection. The computing device can aggregate such requests and use them to determine a service link set for satisfying the demands.

In step 220 of method 200, the computing device can determine a segment of the path (e.g., a segment of path 110). In some embodiments, the segment of the path can be an initial segment of the path. For example, when the path proceeds from node $N_1$ through nodes $N_2$, $N_3$, and $N_4$ to node $N_5$ (e.g., as depicted in FIG. 1), the segment may be node $N_1$ and $N_2$, or nodes $N_1$ to $N_3$, or nodes $N_1$ to $N_4$, or nodes $N_1$ to $N_5$ (e.g., the entire path). In some embodiments, the segment may be determined by concatenating to a current segment the next segment in the path. For example, with reference to FIG. 1, when the current segment includes edges $e_1$ and $e_2$, the computing device can determine the next segment by adding edge $e_3$ to the current segment, or adding edges $e_3$ and $e_4$ to the current segment (to yield the entire path).

In step 230, the computing device can determine a weight for each path pair in the segment. Determining a weight for each path pair can include determining the potential path pairs for the segment. Each path pair can include an initial portion of the segment and a complementary portion of the segment. For example, with reference to FIG. 1, when the segment includes edges $e_1$, $e_2$, and $e_3$, then the path pairs can include:

path pair$\{p_1, p_2\}$, where $p_1 = \{e_1\}$ and $p_2 = \{e_2, e_3\}$ path pair$\{p_3, p_4\}$, where $p_3 = \{e_1, e_2\}$ and $p_1 = \{e_3\}$ The computing device can be configured to determine total weights for sub-paths $p_1$, $p_2$, $p_3$, and $p_4$. The total weights for a sub-path can depend on the set of service links for that sub-path.

In some embodiments, the total weight for a sub-path can be determined using a heuristic. In some instances, for example, the computing device may consider only sets of service links satisfying a criterion when determining a total weight for a sub-path. For example, the computing device may consider only sets of service links of a single transceiver data type when determining a total weight for a sub-path. As an additional or alternative criterion, the computing device may consider only sets of service links that span the sub-path (e.g., service links that originate at the beginning of the sub-path and terminate at the end of the sub-path). In various embodiments, the computing device can use optimization techniques such as integer linear programming (ILP) to determine a total weight for a sub-path. The total weight for each path pair can then be determined based on the total weights for each sub-path. For example, the total weight for each path pair can be the sum of the total weights for the sub-paths.

As a non-limiting example of using a heuristic to determine a total weight for a sub-path, the computing device may consider only sets of service links of a single transceiver data type that span the sub-path. Consistent with this approach, the computing device may determine a set of service links for each transceiver data type. Each set of service links may have an associated weight. For example, the computing device may determine sets of service links SLS(P, D, TD), each with an associated weight W(P, D, TD). TD can be one of the transceiver data types in TD—list, the set of possible transceiver data types, while P can be the sub-path and D can be the set of demands. The computing device may disregard or assign a default weight (e.g., a large or infinite weight) to service links that do not span the path (e.g., service links that originate or end in the middle of the sub-path). The computing device may select the set of service links with the lowest associated weight as the set of service links for the sub-path.

In some embodiments, the determination of SLS(P, D, TD) may be formulated as a bin-packing problem. The bin-packing problem can be solved using a greedy algorithm, or another algorithm adapted to solving bin-packing problems. For example, the computing device can select a demand (arbitrarily or according to some decision rule). If an existing service link has the capacity to accept the demand, then the demand can be associated with this service link. If no existing service link has the capacity to accept the demand, then the computing device can create a new service link to accept the demand. This process can continue until all demands are associated with a service link. The computing device may then determine a total weight for the service link set based on the weights of the service links in the set (e.g., adding up the weights for each service link in the service link set to obtain a total weight). The computing device may determine a set of service links and an associated total weight for each transceiver data type. The computing device may then select the set of service links with the lowest weight as the set of service links for the sub-path.

As a non-limiting example of using an optimization technique to determine a total weight for a sub-path, the computing device can use ILP to determine which of a group of service link sets for a sub-path has the lowest weight. The group of service link sets may include all possible service link sets of the sub-path, or only some of the service links sets for the sub-path. For example, the group of service link sets may include only those service links sets satisfying some criterion. The ILP optimization can be formulated as minimization of an objective function $c^T x$ such that $Ax \leq b$, where $x=(x_1, \ldots, x_n)$ and $x_{i \in \{1, \ldots, n\}}$ is an integer. Depending on the complexity of the problem (e.g., the number of edges in the sub-path, the number of demands, the number of different types of transceiver data types, the number or type of constraints, or the like) and the amount of computing resources available to the computing device (e.g., the processor speed(s), number of processors/cores/threads, available memory, processing time, or the like), the computing device may be able to determine a set of service links that minimizes the objective function subject to the constraints. In some embodiments, when the computing device is unable to determine such a set of service links (e.g., the computing device is unable to determine such a set using the allocated processor time, memory, or the like), the computing device may assign a default weight to the sub-path. This assigned weight may be predetermined (e.g., a worst-case value or an infinite value, or the like).

In some embodiments, the ILP objective function may be formulated as:

$$\min \Sigma_{i=j} \Sigma_{TD} \Sigma_{j \in \{1, \ldots, k_{TD}\}} \text{weight}(TD)^* x(TD, i, j, k)$$

where i is the first node in a section of the sub-path, j is the last node in the section of the sub-path, TD is a transceiver data-type, and the set $\{1, \ldots, k_{TD}\}$ includes the service links of transceiver type TD connecting node i to node j.

In some embodiments, the ILP objective function can be maximized subject to one or more of the following constraints:

Each demand d in the overall set of demands D may be satisfied by at most one service link over each section of the sub-path (e.g., the same demand cannot be allocated to multiple service links in the section). Accordingly:

$$\forall d \in D, \forall i \leq j, \Sigma_{TD} \Sigma_{k \in \{1, \ldots, k_{TD}\}} y(d, TD, i, j, k) \leq 1$$

Each demand d is satisfied by exactly one service link that starts at the first node in the path. Accordingly:

$$\forall d \in D, \Sigma_{TD} \Sigma_{k \in \{1, \ldots, k_{TD}\}} \Sigma_j y(d, TD, 0, j, k) = 1$$

Each demand d is satisfied by exactly one service link that ends at the last node in the path. Accordingly:

$$\forall d \in D, \Sigma_{TD} \Sigma_{k \in \{1, \ldots, k_{TD}\}} \Sigma_j y(d, TD, j, n, k) = 1$$

Each demand d is satisfied by the same number of service links that start at node i and end at node j. Accordingly:

$$\forall d \in D, \forall i \notin \{0, n\}, \Sigma_{TD} \Sigma_{k \in \{1, \ldots, k_{TD}\}} E_{j<i} y(d, TD, j, i, k) - \Sigma_{TD} \Sigma_{k \in \{1, \ldots, k_{TD}\}} \Sigma_{j>i} y(d, TD, i, j, k) = 0$$

Each service link has a capacity bound dependent on the transceiver data type associated with that service link. The total of the demand capacities for the demands associated with the service link is less than this capacity bound. Accordingly:

$$\forall TD \in TD\text{-list}, \forall k \in \{1, \ldots, k_{TD}\}, \forall i \leq j, \Sigma_{d \in D} \text{capacity}(d)^* y(d, TD, i, j, k) \leq \text{capacity}(TD)^* x(TD, i, j, k)$$

Each service link has a maximum length dependent on the transceiver data type associated with that service link. The total length of the section from node i to node j is less than this maximum length. Accordingly, $$\forall TD \in TD\text{-list}, \forall k \in \{1, \ldots, k_{TD}\}, \forall i \leq j, \text{length}(TD)^* x(TD, i, j, k) \geq \text{length}(P_{i,j})^* x(TD, i, j, k)$$

The computing device can be configured to determine a set of service links that minimizes the object function subject to the constraints. The computing device can be configured to determine this set of service links using a solver such as CPLEX® Optimizer®, Modular In-core Nonlinear Optimization System (MINOS), COIN-OR Linear Programming (CLP), GNU Linear Programming Kit (GLPK), or the like. The disclosed embodiments are not limited to embodiments that identify a set of service links for a sub-path using the particular heuristic described above, or using ILP. Consistent with disclosed embodiments, the computing device may use other approaches to determining a set of service links for a sub-path, without limitation.

In step 240, the computing device can be configured to select a path pair based on the total weights determined in step 230 for each path pair in the segment. In some instances, the computing device can be configured to select the path pair having the lowest total weight. Such selection can include, without limitation, storing (e.g., in a storage medium of the computing device or accessible to the computing device, or the like) at least one of the selected path pair or an indication of the selected path pair (e.g., a name, label, listing, pointer or reference to the selected path pair or the sets of service links for the selected pair, or the like). Such selection may further include, in some embodiments, storing (e.g., in a storage medium of the computing device or accessible to the computing device, or the like) at least one of the total weight of the selected path pair or an indication of the total weight of the selected path pair (e.g., pointer or reference to the total weight, or the like).

In step 250, the computing device can determine whether the segment is equal to the overall path. When the segment is equal to the overall path, then the selected path pair with the minimum total weight for the segment can be the selected path pair with the minimum total weight for the overall path. Method 200 can then proceed to step 260. When the segment is a subset of the overall path, then method 200 can return to step 220. As described above, in step 220 the computing device can determine a new segment. This new segment can be, in some instances, an extension of the segment for which the path pairs were selected in step 240.

In step 260, the computing device can be configured to select the path pair for the segment as the path pair for the overall path. Such selection can include, without limitation, storing, as the path pair for the overall path, at least one of the selected path pair or an indication of the selected path pair (e.g., a name, label, listing, pointer or reference to the selected path pair or the sets of service links for the selected pair, or the like). Such selection may further include, in some embodiments, storing at least one of the total weight of the selected path pair or an indication of the total weight of the selected path pair (e.g., pointer or reference to the total weight, or the like).

In some embodiments, during or after step 260, the computing device can configure communication network 100 to use the sets of service links for the selected path pair to satisfy the demands over the path. For example, the computing device can be configured to provide instructions to switches, routers, transceiver-transponders, or the like of the communications network 100. The instructions can configure these switches, routers, transceiver-transponders, or the like to use the service links for the selected path pair to satisfy the demands over the path.

In some embodiments, rather than determining weights for each path pair in step 230, the computing device can be configured to determine total weights for at least some sub-paths prior to step 230. These total weights can be determined, in some instances, prior to determining the segment in step 220. For example, the computing device can be configured to determine such total weights as an initial step, after obtaining the path, demands, and one or more transceiver data types in step 210.

Figure 3:
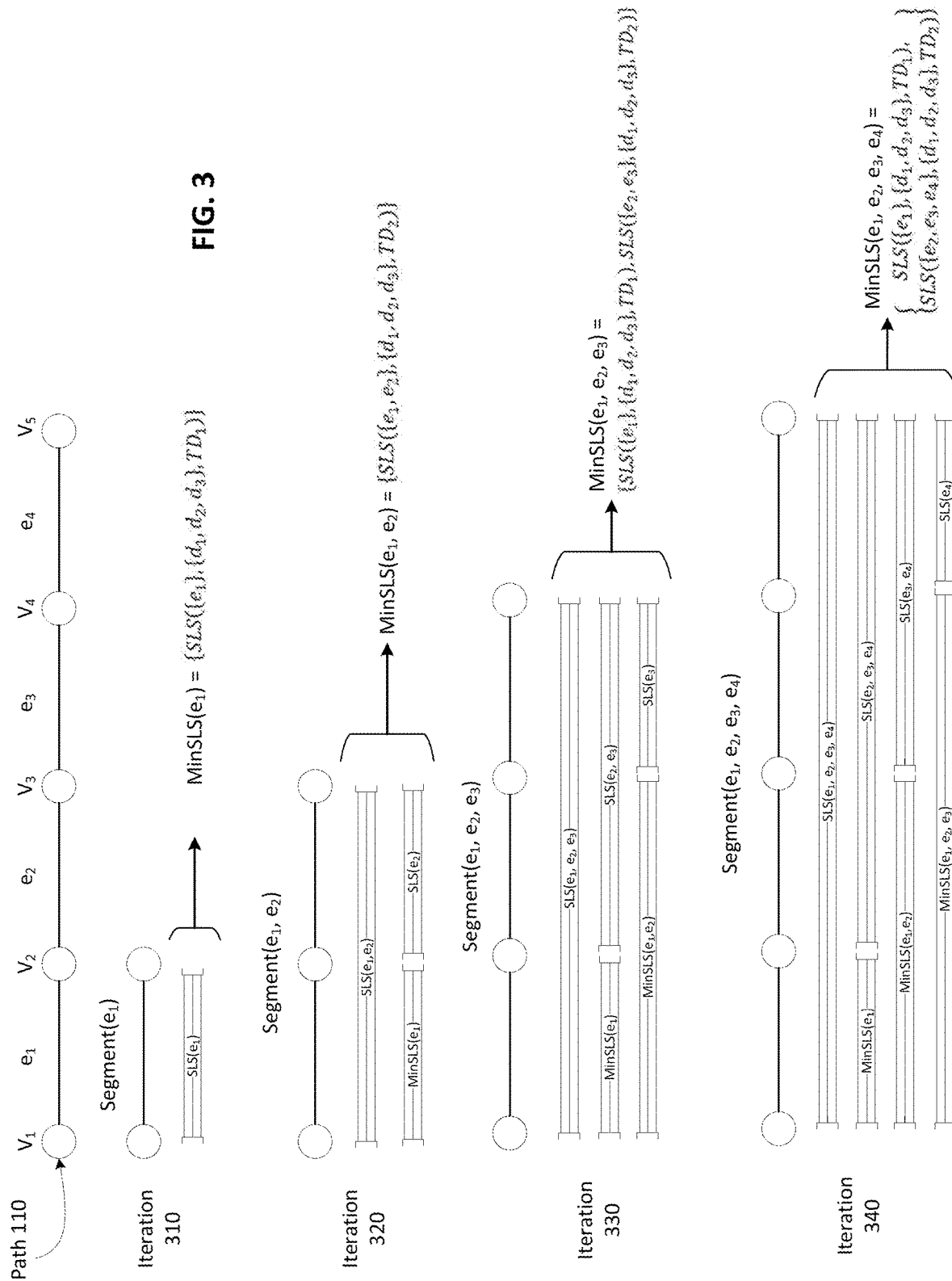
FIG. 3 depicts an exemplary selection of service links for a path, consistent with disclosed embodiments.

FIG. 3 depicts exemplary selection of service links for the path 110 from FIG. 1, consistent with disclosed embodiments. In the example depicted, selection of these service links occurs in four iterations. In this non-limiting example, sets of service links are determined for sub-paths using the heuristic approach outlined above with regards to step 230 of FIG. 2.

In iteration 310 the segment can include a single edge (e.g., $e_1$), as shown. The segment can be divided into a null initial portion and a complementary portion including the first edge, or an initial portion including the first edge and a null complementary portion. The weight of a null initial or complementary portion can be deemed to be zero.

The computing device can determine a set of service links satisfying the demands over the non-null initial or complementary portion for each of the transceiver data types (e.g., $TD_1$ and $TD_2$). The length of edge $e_1$ is 800, so the length bounds associated with both $TD_1$ and $TD_2$ are satisfied. Using a greedy algorithm that progressively assigns demands to available service links, if possible, creating new service links if necessary, the following sets of service links can be identified:

$SLS(\{e_1\},\{d_1, d_2, d_3\}, TD_1)$ can include a single service link satisfying all of the demands, with an associated weight $W(\{e_1\},\{d_1, d_2, d_3\}, TD_1)=17$. $SLS(\{e_1\},\{d_1, d_2, d_3\}, TD_2)$ can include two parallel service links, the first satisfying demands $d_1$ and $d_2$, the second satisfying demand $d_3$. The associated weight $W(\{e_1\}, \{d_1, d_2, d_3\}, TD_2)=2\times13=26$. As the weight associated with $SLS(\{e_1\},\{d_1, d_2, d_3\}, TD_1)$ is lower than the weight associated with $SLS(\{e_1\},\{d_1, d_2, d_3\}, TD_2)$, the computing device can select $SLS(\{e_1\},\{d_1, d_2, d_3\}, TD_1)$ as the set of service links for the segment (e.g., as $MinSLS(e_1)$).

The disclosed embodiments are not limited to embodiments starting with a single edge. In some embodiments, the determination can start with a segment including two or more edges (e.g., the determination can start with the segment depicted in iteration 320).

In iteration 320, the segment can include two edges (e.g., $e_1$ and $e_2$). Two path pairs can be generated for this segment. A first path pair for this segment can include a null portion (having a null weight) and a complementary portion spanning two edges. A second path pair for this segment can include an initial portion including edge $e_1$ and a complementary portion including edge $e_2$.

The computing device can determine a total weight for the first path pair. The null portion can have a weight of zero. The computing device can determine a set of service links (e.g., $SLS(e_1, e_2)$) and associated weight for the complementary portion spanning two edges. The total length of edges $e_i$ and $e_2$ is 1500, so the metric bound associated with $TD_1$ (e.g., 800) is not satisfied. Accordingly, the computing device may disregard this service link set, or assign it a predetermined value (e.g., infinity). The computing device can identify a set of service links $SLS(\{e_1, e_2\},\{d_1, d_2, d_3\}, TD_2)$ that satisfy the demands using a bin-packing algorithm, as described herein. This set of service links can include two parallel service links, the first satisfying demands $d_1$ and $d_2$, the second satisfying demand $d_3$. The associated weight $W(\{e_1, e_2\},\{d_1, d_2, d_3\}, TD_2)=2\times13=26$. As the null portion has a weight of zero, the total weight for the first path pair can be 26.

The computing device can determine a total weight for the second path pair. The lowest weight over edge $e_i$ was previously determined in iteration 310 (e.g., the weight of 17 associated with $MinSLS(e_1)$). The computing device can determine the set of service links with the lowest determined total weight that satisfies the demands over edge $e_2$ (e.g., $SLS(e_2)$). The metric of edge $e_2$ is 700, so the metric bounds associated with both $TD_1$ and $TD_2$ are satisfied. The computing device can determine a set of service links and associated weights for each transceiver data type:

$SLS(\{e_2\},\{d_1, d_2, d_3\}, TD_1)$ can include a single service link satisfying all of the demands, with an associated weight $W(\{e_2\},\{d_1, d_2, d_3\}, TD_1)=17$. $SLS(\{e_2\},\{d_1, d_2, d_3\}, TD_2)$ can include two parallel service links, the first satisfying demands $d_1$ and $d_2$, the second satisfying demand $d_3$. The associated weight $W(\{e_2\},\{d_1, d_2, d_3\}, TD_2)=2\times13=26$.

As the weight associated with $SLS(\{e_2\},\{d_1, d_2, d_3\},TD_1)$ is lower than the weight associated with $SLS(\{e_2\},\{d_1, d_2,$ $d_3\}$, $TD_2$), the computing device can select SLS($\{e_2\},\{d_1, d_2, d_3\}$, $TD_1$) as the set of service links with the lowest determined total weight that satisfies the demands over edge $e_2$ (e.g., SLS($e_2$)).

The total weight associated with the second path pair for the segment can be the sum of the weights associated with each sub-path (e.g., W($\{e_1\},\{d_1, d_2, d_3\}$, $TD_1$)+W($\{e_2\},\{d_1, d_2, d_3\}$, $TD_1$)=34).

As the total weight for first path pair (26) is less than the weight for the second path pair (34), the computing device can select the first path pair as the set of service links for this segment (e.g., the computing device can select the first path pair as MinSLS($e_1$, $e_2$)).

In iteration 330, the segment can include three edges (e.g., $e_1$, $e_2$, and $e_3$). Three path pairs can be generated for this segment. A first path pair can include a null portion (having a null weight) and a complementary portion spanning three edges. A second path pair can include an initial portion including edge $e_1$ and a complementary portion including edges $e_2$ and $e_3$. A third path pair can include an initial portion including edges $e_1$ and $e_2$ and a complementary portion including edge $e_3$.

The computing device can determine a total weight for the first path pair. The null portion can have a weight of zero. The total length of the complementary portion spanning edges $e_1$, $e_2$, and $e_3$ is 1900, so the length bounds associated with $TD_1$ and $TD_2$ are not satisfied. Accordingly, the computing device may disregard the first path pair, or assign it a predetermined total weight (e.g., infinity).

The computing device can determine a total weight for the second path pair. The lowest weight over edge $e_1$ was previously determined in iteration 310 (e.g., the weight of 17 associated with MinSLS($e_1$)). The computing device can determine the set of service links with the lowest determined total weight that satisfies the demands over edges $e_2$ and $e_3$ (e.g., SLS($e_2$, $e_3$)). The total length of these edges is 1100, so only the length bound associated with $TD_2$ is satisfied. The computing device can determine a set of service links SLS($\{e_2, e_3\},\{d_1, d_2, d_3\}, TD_2$) that includes two parallel service links that together satisfy the demands, with an associated weight W($\{e_2, e_3\},\{d_1, d_2, d_3\}TD_2$)=2×13=26. The total weight associated with the second path pair for the segment can be the sum of the weights associated with each sub-path (e.g., W($\{e_1\},\{d_1, d_2, d_3\}, TD_1$)+W($\{e_2, e_3\},\{d, d_2, d_3\}, TD_2$)=17+26=43).

The computing device can determine a total weight for the third path pair. The lowest weight over edges $e_1$ and $e_2$ was previously determined in iteration 320 (e.g., the weight of 26 associated with MinSLS($e_1$, $e_2$)). The computing device can determine the set of service links with the lowest determined total weight that satisfies the demands over edge $e_3$ (e.g., SLS($e_3$)). The total length of this edge is 400, so the length bounds associated with $TD_1$ and $TD_2$ are both satisfied. The computing device can determine sets of service links for each of these transceiver data types. As can be appreciated from the forgoing, the computing device can identify a set of service links SLS($\{e_3\}, \{d_1, d_2, d_3\}, TD_1$) that includes a single service link satisfying all of the demands as the lowest-weight set of service links. The associated weight can be W($\{e_3\},\{d_1, d_2, d_3\}, TD_1$)=17. The total weight for the third path pair can be the weights associated with each sub-path (e.g., W($\{e_1, e_2\},\{d_1, d_2, d_3\}, TD_2$)+W($\{e_3\},\{d_1, d_2, d_3\}, TD_2$)=26+17=43).

The computing device may disregard the first path pair, as the total length of the complementary segment exceeds the length bounds for both transceiver data types. As the total weight for second path pair (43) and the third path pairs (43) are equal, the computing device may select one of these path pairs as the set of service links for this segment, randomly or according to some tie-breaking criterion. For example, the computing device can randomly select the second path pair as the set of service links for this segment (e.g., the computing device can select the second path pair as MinSLS($e_1$, $e_2$, $e_3$)).

In iteration 340, the segment can include four edges (e.g., $e_1$, $e_2$, $e_3$, and $e_4$). Four path pairs can be generated for this segment. A first path pair can include a null portion (having a null weight) and a complementary portion spanning four edges. A second path pair can include an initial portion including edge et and a complementary portion including edges $e_2$, $e_3$, and $e_4$. A third path pair can include an initial portion including edges $e_1$ and $e_2$ and a complementary portion including edges $e_3$ and $e_4$. A fourth path pair can include an initial portion including edges $e_1$, $e_2$, and $e_3$ and a complementary portion including edge $e_4$.

The computing device can determine a total weight for the first path pair. The null portion can have a weight of zero. The total length of the complementary portion spanning edges $e_1$, $e_2$, $e_3$, and $e_4$ is 2200, so the length bounds associated with $TD_1$ and $TD_2$ are not satisfied. Accordingly, the computing device may disregard the first path pair, or assign it a predetermined total weight (e.g., infinity).

The computing device can determine a total weight for the second path pair. The initial portion including edge et can have the weight determined in iteration 310 (e.g., 17). The computing device can determine the set of service links with the lowest determined total weight that satisfies the demands over edges $e_2$, $e_3$, and $e_4$ (e.g., SLS($e_2$, $e_3$, $e_4$)). The total length of the complementary portion spanning edges $e_2$, $e_3$, and $e_4$ is 1400, so the length bound associated with $TD_1$ is not satisfied. However, the length bound associated with transceiver data type $TD_2$ is satisfied. As can be appreciated from the foregoing, the computing device can determine a set of service links SLS($\{e_2, e_3, e_4\},\{d_1, d_2, d_3\}, TD_2$) that includes two parallel service links that together satisfy the demands, with an associated weight W($\{e_2, e_3, e_4\},\{d_1, d_2, d_3\}, TD_2$)=2×13=26. The total weight for the second path pair can then be the sum of the total weights for each sub-path (e.g., 43).

The computing device can determine a total weight for the third path pair. The initial portion including edges $e_1$ and $e_2$ can have the weight determined in iteration 320 (e.g., 34). The computing device can determine the set of service links with the lowest determined total weight that satisfies the demands over edges $e_3$ and $e_4$ (e.g., SLS($e_3$, $e_4$)). The total length of the complementary portion spanning edges $e_3$ and $e_4$ is 700, so the length bounds associated with $TD_1$ and $TD_2$ are satisfied. As can be appreciated from the foregoing, the computing device can determine a lowest-weight set of service links SLS($\{e_3, e_4\},\{d_1, d_2, d_3\}, TD_1$) that includes a single service link that satisfies the demands, with an associated weight W($\{e_3, e_4\},\{d_1, d_2, d_3\}, TD_1$)=13. The total weight for the second path pair can then be the sum of the total weights for each sub-path (e.g., 47).

The computing device can determine a total weight for the fourth path pair. The initial portion including edges $e_1$, $e_2$, and $e_3$ can have the weight determined in iteration 330 (e.g., 43). The computing device can determine the set of service links with the lowest determined total weight that satisfies the demands over edges $e_4$ (e.g., SLS($e_4$)). The total length of the complementary portion spanning edge $e_4$ is 300, so the length bounds associated with $TD_1$ and $TD_2$ are satisfied. As can be appreciated from the foregoing, the computing device can determine a lowest-weight set of service links SLS($\{e_3$, $e_4$}, {$d_1$, $d_2$, $d_3$}, TD) that includes a single service link that satisfies the demands, with an associated weight W({$e_3$, $e_4$}, {$d_1$, $d_2$, $d_3$}, $TD_1$)=13. The total weight for the second path pair can then be the sum of the total weights for each sub-path (e.g., 56).

The computing device may disregard the first path pair, as the total length of the complementary segment exceeds the length bounds for both transceiver data types. The total weight for second path pair is 43, the total weight for the third path pair is 47, and the total weight for the fourth path pair is 56. The computing device may therefore select the second path pair as the set of service links for this segment (e.g., the computing device can select the second path pair as MinSLS($e_1$, $e_2$, $e_3$, $e_4$)).

The segment in iteration 340 is coterminous with the entire path. Thus, the second path pair is the set of service links with the lowest determined total weight that satisfy the demands over the entire path. This second path pair includes the set of service links with lowest total weight for edge et (e.g., SLS($e_1$)) and the set of service links with the lowest total weight for edges $e_2$, $e_3$, and $e_4$ (e.g., SLS($e_2$, $e_3$, $e_4$)). Together, these sets of service links have the lowest determined total weight that satisfy the demands over the entire path.

As can be appreciated from the foregoing, the computing device can be configured to reuse, in later iterations, determinations made in previous iterations. In some instances, once a set of service links has been identified as having the lowest determined total weight over a sub-path, the computing device can reuse that set of service links whenever the sub-path is encountered in subsequent iterations (e.g., without re-determining or deriving that set of service links). For example, SLS({$e_1$}, {$d_1$, $d_2$, $d_3$}, $TD_1$) is identified as having the lowest determined total weight over sub-path $e_1$ in iteration 310. The computing device can then reuse that determination in iterations 320 to 340 when evaluating the lowest determined total weight over the sub-path $e_1$. Likewise, the SLS({$e_i$, $e_2$},{$d_1$, $d_2$, $d_3$}, $TD_2$) is identified as having the lowest determined total weight over the path including edges $e_1$ and $e_2$ in iteration 320. The computing device can then reuse this determination in iterations 330 and 340 when evaluating the lowest determined total weight over the sub-path $e_1$, $e_2$. In this manner, method 200 can increase speed and decrease the usage of computing resources by avoiding re-determination of the set of service links with the lowest determined total weight for previously encountered sub-paths.

The foregoing example is not intended to be limiting. As described above, with regards to step 230 of FIG. 2, in some embodiments an optimization techniques such as integer linear programing can be used to determine a total weight for a sub-path. However, determination of a lowest-weight set of service links over some paths (e.g., those including multiple edges) may be computationally infeasible. Accordingly, in such embodiments, the computing device may allocate a certain amount of computing resources (e.g., a certain amount of time, processing power, or the like) to determining the lowest-weight set of service links over a path. Should the allocated computing resources be expended before determination of the lowest-weight set of service links is complete, the computing device may associate the path with the lowest-total-weight set of service links so far identified (if any) or may disregard the path pair including the path. The computing device may proceed with determining weights for other path pairs. For example, with reference to iteration 340 of FIG. 3, the computing device may attempt to determine a set of service links for the complementary portion including edges $e_1$, $e_2$, $e_3$, and $e_4$. The computing device may be unable to complete this determination in an allocated time. The computing device may consequently associate the complementary portion with the lowest-weight set of service links identified in the allocated time, or may disregard the path pair including this sub-path (e.g., the path pair including the empty sub-path and this complementary portion).

In some embodiments, as described herein, simplifying assumptions or heuristics may be used to determine a set of service links and corresponding total weight for a path. The shorter the path (e.g., the fewer edges the path includes), the closer in total weight the determined set of service links may be to the optimal set of service links (e.g., the set of service links satisfying the demands on the path and having the lowest total weight for the path). Conversely, the longer the path, the greater the deviation between the total weight for the determined set of service links and the total weight for the optimal set of service links. Accordingly, in some embodiments, the computing device may forego determining sets of service links for paths longer than some threshold length. The particular threshold may depend on the network, transceiver data types, demands, or other factors and may be selected or empirically determined.

As a non-limiting example, a path on a communication network (e.g., similar to path 110 on communications network 100) can include k edges, each edge having a metric value (e.g., length) of n. In this example, the path can be associated with demands {$d_1$, $d_2$, $d_3$, $d_4$}, each having a demand capacity of v. In this example, the communication network can be associated with three transceiver data types:

$TD_1$ can have a capacity bound of 4v, a metric value bound of n, and a weight value of p.

$TD_2$ can have a capacity bound of 2v, a metric value bound of 2n, and a weight value of q.

$TD_3$ can have a capacity bound of v, a metric value bound of 3n, and a weight value of r.

In this non-limiting example, $r<q<p$ and $p<2q<4r$.

A computing device can be configured to determine a set of service links that satisfy the demands over the path, in accordance with the examples and methods described above with regards to FIGS. 1 to 3. The service links selected by the computing device can depend on the relative values of the weights and the value of k.

In some instances, $4r>p+2q$ and k is even. In such instances, a computing device selecting service links in accordance with the examples and methods described above with regards to FIGS. 1 to 3 may select, as the set of service links satisfying the demands on the communications network, k service links of transceiver data type $TD_2$. The total weight associated with the selected set of service links is then kq.

In some instances, $4r>p+2q$ and k is odd. In such instances, a computing device selecting service links in accordance with the examples and methods described above with regards to FIGS. 1 to 3 may select, as the set of service links satisfying the demands on the communications network, k−1 service links of transceiver data type $TD_2$ and one service link of transceiver data type $TD_2$. The total weight associated with the selected set of service links is then p+(k−1)q.

In some instances, $4r<p+2q$ and $4r>3q$ and k is even. In such instances, a computing device selecting service links in accordance with the examples and methods described above with regards to FIGS. 1 to 3 may select, as the set of service links satisfying the demands on the communications network, k service links of transceiver data type $TD_2$. The total weight associated with the selected set of service links is then kq.

In some instances, $4r<p+2q$ and $4r>3q$ and k is odd but not equal to 1. In such instances, a computing device selecting service links in accordance with the examples and methods described above with regards to FIGS. 1 to 3 may select, as the set of service links satisfying the demands on the communications network, k–3 service links of transceiver data type $TD_2$ and four service links of transceiver data type $TD_3$. The total weight associated with the selected set of service links is then $4r+(k-3)q$.

In some instances, $4r<p+2q$ and $4r>3q$ and k is equal to 1. In such instances, a computing device selecting service links in accordance with the examples and methods described above with regards to FIGS. 1 to 3 may select, as the set of service links satisfying the demands on the communications network, one service link of transceiver data type $TD_1$. The total weight associated with the selected set of service links is then p.

In some instances, $4r<p+2q$ and $p+4r<4q$ and k mod 3=0. In such instances, a computing device selecting service links in accordance with the examples and methods described above with regards to FIGS. 1 to 3 may select, as the set of service links satisfying the demands on the communications network, 4k/3 service links of transceiver data type $TD_3$. The total weight associated with the selected set of service links is then 4kr/3.

In some instances, $4r<p+2q$ and $p+4r<4q$ and k mod 3=1. In such instances, a computing device selecting service links in accordance with the examples and methods described above with regards to FIGS. 1 to 3 may select, as the set of service links satisfying the demands on the communications network, 4(k–1)/3 service links of transceiver data type $TD_3$ and one service link of transceiver data type $TD_1$. The total weight associated with the selected set of service links is then $p+4(k-1)r/3$.

In some instances, $4r<p+2q$ and $p+4r<4q$ and k mod 3=2. In such instances, a computing device selecting service links in accordance with the examples and methods described above with regards to FIGS. 1 to 3 may select, as the set of service links satisfying the demands on the communications network, 4(k–2)/3 service links of transceiver data type $TD_3$ and two service links of transceiver data type $TD_2$. The total weight associated with the selected set of service links is then $2q+4(k-2)r/3$.

As would be appreciated by those of skill in the art, the forgoing example describes a particular arrangement of edges, demands, and transceiver data types, and is not intended to be limiting.

Service Link Decomposition

Figure 4:
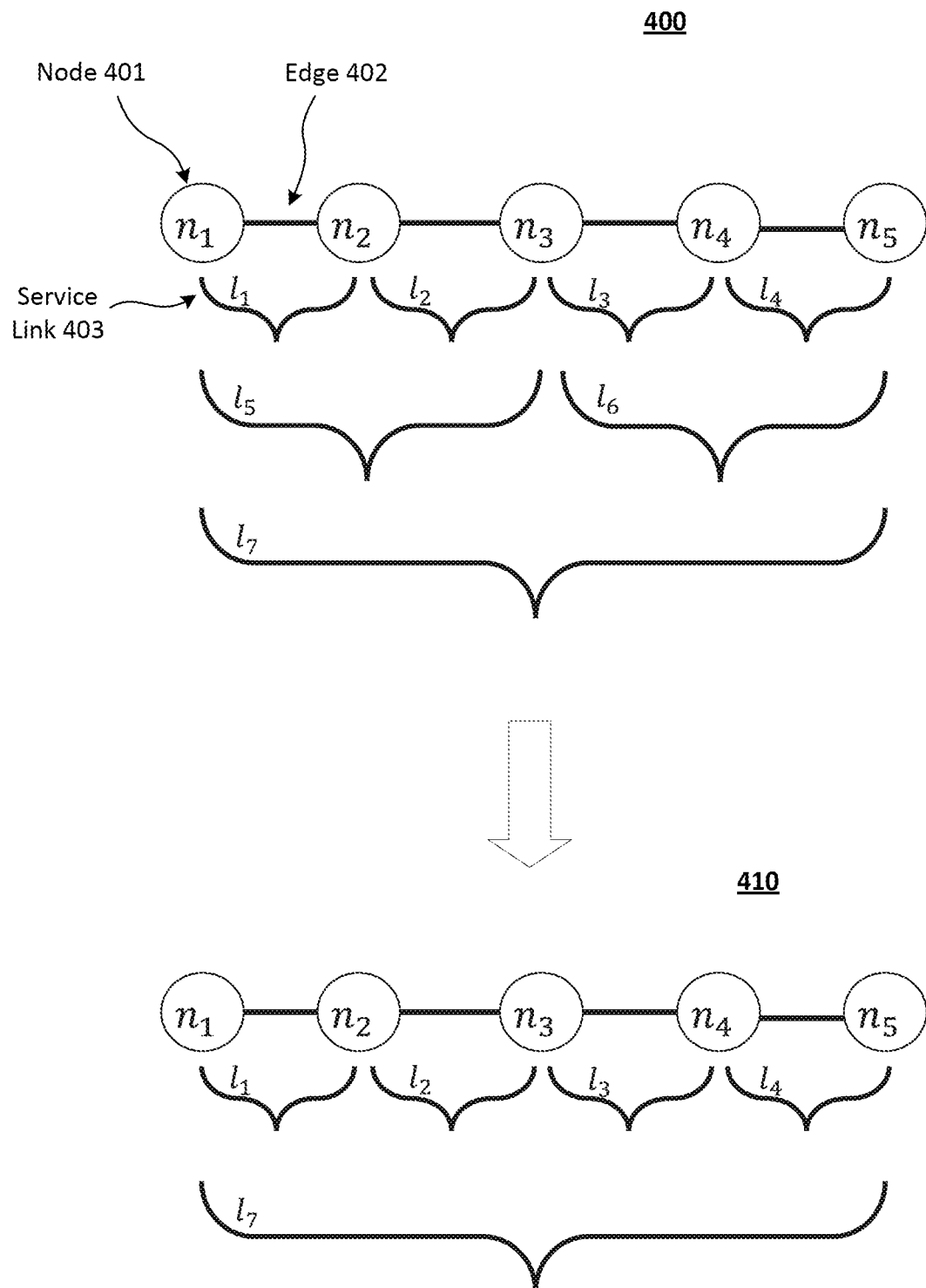
FIG. 4 depicts an exemplary determination of a spanning subset of service links for an exemplary communication network, consistent with disclosed embodiments.

FIG. 4 depicts determination of a spanning subset of service links for exemplary communication network 100, consistent with disclosed embodiments. FIG. 4 depicts representation 400 of communication network 100. As described herein, communication network 100 can be an optical communication network (e.g., a fiber optic network), an electrical communication network (e.g., an ethernet or PSTN network), or a hybrid network including optical and electrical components. Representation 400 comprises nodes (e.g., node 401) that are connected by edges (e.g., edge 402). In some instances, depending on the communications network, representation 400 can be a graph, such as a cycle graph. As described above, a node can represent one or more signal-handling devices, which may or may not be geographically co-located. An edge can represent one or more signal pathways connecting or potentially connecting two nodes. A set of service links can be associated with the communications network (e.g., service link 403). Each service link can be associated with a path (e.g., a set of edges on the communication network spanned by the service link). Each service link may have a set of demands that use the service link. As described herein, such demands can arise from user requests for streaming video, videoconferencing applications, web surfing, or the like. The disclosed embodiments are not limited to any particular demand type or demand origin. Each demand can have a demand capacity and each service link can have a capacity bound—e.g., the sum of the demand capacities for the demands satisfied by the service link cannot exceed this capacity bound. In the example depicted in FIG. 4, service links $l_1$ to $l_4$ are associated with demands $d_1$ to $d_4$, each with a demand capacity of 20, service link $l_5$ is associated with a demand $d_5$ with a demand capacity of 40, service link $l_6$ is associated with a demand $d_6$ with a demand capacity of 60, and service link $l_7$ is associated with a demand $d_7$ with a demand capacity of 60. Each service link, in this non-limiting example, has a capacity bound of 100. As described above, the disclosed embodiments are not limited to a particular measure of demand or capacity bound and the descriptions provided herein use unitless numbers for convenience of explanation.

A computing device associated with the communications network may be configured to determine a reduced subset of the service links that can satisfy the demands. In some embodiments, this reduced subset may satisfy the demands without violating any capacity bound or changing the path of any service link. The reduced subset of service links can be achieved by "decomposing" service links (e.g., assigning the demands satisfied by the service link to other service links). As a non-limiting example, a service link l has a path p along a set of edges in the communication network. The service link l satisfies a demand d with a demand capacity x. Service links $\{l_1, \ldots, l_t\}$ have paths $\{p_1, \ldots, p_t\}$ and satisfy demands $\{d_1, \ldots, d_t\}$ with demand capacities $\{x_1, \ldots, x_t\}$ and capacity bounds $\{m_1, \ldots, m_t\}$.

Then $dec(l)=\{l_1, \ldots, l_t\}$ is a decomposition of l when:

The concatenation of paths $\{p_1, \ldots, p_t\}$ equals p. As an example of such concatenation, concatenating the paths of $l_1$ and $l_2$ yields the path of $l_5$, while concatenating service link $l_4$ with a service link having a path from node $n_2$ to $n_4$ would not yield the path of $l_6$, as the resulting path would start at $n_2$, not $n_3$.

The service links $\{l_1, \ldots, l_t\}$ can satisfy demand d without exceeding their individual capacity bounds. As an example:

$$\Sigma_{i \in S} x(i) \leq m(i)$$

where S is the union of demands $\{d_1, \ldots, d_t\}$ and demand d, i is a demand in S, x(i) is the demand capacity of demand i, and m(i) is the capacity bound of demand i.

The set of all possible decompositions of service link l is denoted DEC(l). As can be observed from the definition of decomposition, each demand can be decomposed into itself (e.g., the trivial decomposition). In some embodiments, DEC(l) includes the trivial decomposition.

In some embodiments, the decomposed service link can be removed from the representation of the communication network. In various embodiments, after determining the reduced subset of service links, the computing device or another device can provide instructions to the signal-handling devices represented by the nodes. These instructions can configure the nodes (and thus the communication network) to satisfy the demands using the reduced set of service links. For example, the instructions can configure the signal-handling devices to modify a service link to satisfy additional demands, or tear down a decomposed service link.

Representation 410 depicts a spanning subset that is capable of satisfying all of the demands satisfied by representation 400, without requiring as many service links. For example, where $L=\{l_1, \ldots, l_r\}$ is a set of service links having paths $\{p_1, \ldots, p_r\}$, then $L' \subseteq L$ is a spanning subset of L when there exists a decomposition $dec(l_i)$ for all $l_i' \in L$ that includes only service links in L and the capacity bounds remain satisfied for all $l_i \in L'$ after reassignment of demands from the decomposed service links to the service links in L'. As may be appreciated from the foregoing, determining that each decomposition in a spanning subset is individually valid does not necessarily imply that the spanning subset is valid. A service link may receive demands from multiple decomposed service links. These additional demands may collectively cause the service link to exceed its capacity, even when each additional demand does not individually cause the service link to exceed its capacity bound.

In representation 410, service links $l_5$ and $l_6$ have been decomposed into service links $l_1$ and $l_2$ and $l_3$ and $l_4$, respectively. Demand $d_5$ is satisfied by service links $l_1$ and $l_2$, while demand $d_5$ is satisfied by service links $l_3$ and $l_4$. The sum of the demand capacities satisfied by $l_1$ and $l_2$ is 60, while the sum of the demand capacities satisfied by service links $l_3$ and $l_4$ is 80. As these total demand capacities are less than the capacity bounds of links $l_1$ to $l_4$, the decomposition of links $l_5$ and $l_6$ depicted in representation 410 is valid. In contrast, in some embodiments, decomposing service link $l_7$ into service link $l_6$ would require service link $l_6$ to satisfy demands $d_3$ and $d_4$. However, service link $l_6$ has a capacity bound of 100, while the sum of the demand capacities of demands $d_3$ and $d_4$ is 120. As the sum of the demand capacities exceeds the capacity bound, the decomposition of $l_7$ into service links $l_1$, $l_2$, and $l_6$ would not be valid.

Figure 5:
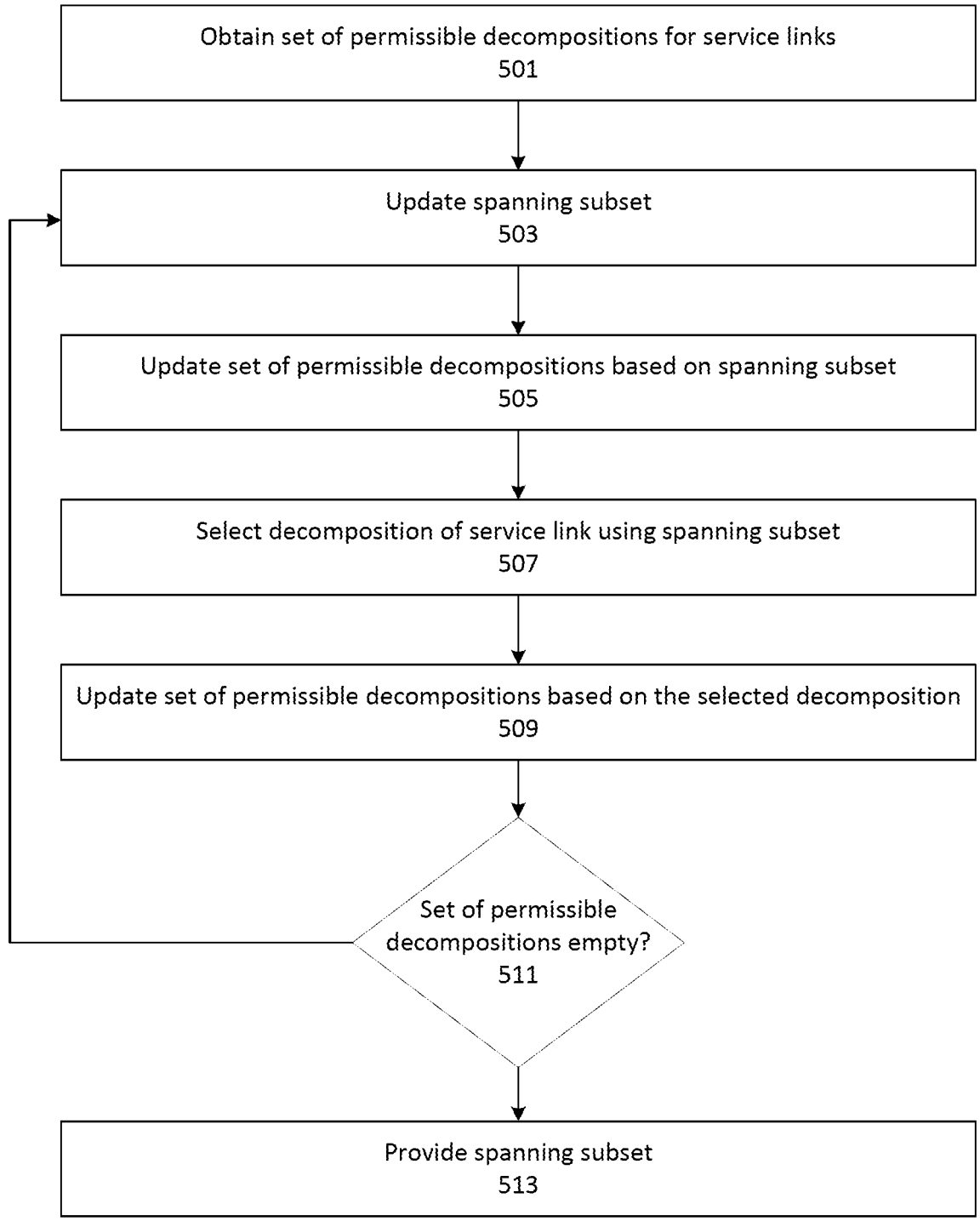
FIG. 5 depicts an exemplary method for generating a spanning subset of service links for a communication network, consistent with disclosed embodiments.

FIG. 5 depicts a method 500 for generating a spanning subset of service links for a communication network, consistent with disclosed embodiments. In some embodiments, method 500 can include iteratively processing a set of decompositions for a set of service links to generate a spanning subset of the service links. In each iteration, the set of decompositions can be used to select service links for inclusion in the spanning subset and the set of decompositions can be updated. In some embodiments, the selected service links may lack a non-trivial decomposition in the set of decompositions. In various embodiments, updating the set of decompositions can include selecting a non-trivial decomposition of a service link in the set of decompositions. The demand for the selected service link can be re-allocated according to the non-trivial decomposition. The set of decompositions can then be updated to remove decompositions of the selected service link and decompositions rendered invalid by the re-allocation of demands. In some embodiments, the iterative processing of the set of decompositions can proceed until the set of decompositions is empty. The spanning subset may then include service links capable of satisfying the demands associated with the original set of service links without changing any service link paths. In this manner, method 500 can be used to reduce the number of service links required to satisfy the demands on communication network 100. Reducing the number of service links required to satisfy the demands on communication network 100 may improve the performance of communication network 100, whether by increasing the number of demands the network can handle, making more efficient use of existing service links, or reducing the computational or physical (e.g., equipment or the like) resources used to maintain communication network 100 or satisfy demands on communication network 100.

In step 501, a computing device can be configured to obtain a set of permissible decompositions for a set of service links associated with communication network 100. The computing device can be a physical device (e.g., a laptop, desktop, workstation, server, cluster, or the like) or a virtual device (e.g., a virtual machine, cloud computing environment, assortment of compute and memory resources, or the like). The computing device can be part of, or be co-located with, equipment implementing communication network 100. In various embodiments, the computing device can determine the set of permissible decompositions, receive the set of permissible decompositions from another computing device, or retrieve the set of permissible decompositions from a non-transitory computer-readable medium, such as a storage device or computer memory. The computing device can obtain the set of permissible decompositions automatically or in response to user input. In some embodiments, the computing device can obtain the set of permissible decompositions repeatedly, periodically, or according to a schedule; in response to an indication from the communication network; or the like.

In step 503, the computing device can be configured to update a spanning subset. Updating the spanning subset may include adding service links to the spanning subset. In some embodiments, the spanning subset may be created as an empty set and then service links may be added to it. In various embodiments, one or more service links may be selected for inclusion in the spanning subset. The spanning subset may be created including these selected one or more service links. In some embodiments, in step 503, the computing device can be configured to identify service links in the set of decompositions that lack a non-trivial decomposition (e.g., basic service links). As described above, for such basic service links, the only permissible decomposition may be the service link itself. The computing device can be configured to add any such identified service links to the spanning subset.

In step 505, the computing device can be configured to update the set of permissible decompositions based on the spanning subset. Such updating can include removing from the set of permissible decompositions any decompositions of service links in the spanning subset. For example, when the computing device identifies a service link as a basic service link (e.g., because the set of permissible decompositions includes only a trivial decomposition of this service link), the computing device may add the service link to the spanning subset and remove the trivial decomposition of the service link from the set of permissible decompositions. The updating of the spanning subset and the set of permissible decompositions can occur in any order and can occur a single operation or multiple operations (e.g., step 505 can occur before step 503, step 503 and step 505 can occur in a single operation, or the like).

In step 507, the computing device can be configured to select one of the permissible decompositions. This decomposition can be selected based on the spanning subset. In some embodiments, the computing device can identify decompositions in the set of permissible decompositions that include only service links in the spanning subset. For example, with regard to FIG. 4, service link $l_7$ can be validly decomposed into three decompositions:

$$DEC(l_7)=\{\{l_5,l_3,l_4\},\{l_1,l_2,l_3,l_4\},\{l_7\}\}$$

In this example, service links $l_1$, $l_2$, $l_3$, and $l_4$ are basic service links and $l_5$ is not. The computing device can then identify the decomposition $dec(l_7)=\{l_1, l_2, l_3, l_4\}$ as including only basic service links.

In some embodiments, the computing device can select one of the identified decompositions (e.g., those including only basic service links). When multiple decompositions are identified, the computing device can be configured to determine, for each of the multiple service links (e.g., each "potential selection"), how many additional decompositions would be prevented by selecting that service link. In some embodiments, the computing device can be configured to determine, for each potential selection, the number of decompositions that would be removed from the set of permissible decompositions (e.g., "the number of potential removals") due to violations of capacity constraints (e.g., as in step 509, below). In some embodiments, having determined the number of potential removals for each potential selection, the computing device can select the potential selection having the smallest number of potential removals. In some embodiments, the computing device may simulate one or more additional iterations of this process. As an example of performing one additional iteration, the computing device may determine, for each potential selection, the service links available for decomposition (e.g., the "second-order potential selections"). The computing device can be configured to determine, for each combination of a potential selection and a resulting second-order potential selection, the total number of decompositions that would be removed from the set of permissible decompositions. The computing device may select the potential selection with the smallest total number of decompositions.

In step 509, the computing device can be configured to update the set of permissible decompositions based on the selected decomposition. In some embodiments, as detailed below with regard to FIG. 8, updating the set of permissible decompositions can include removing from the set of permissible decompositions any decomposition of the selected service link or including the selected service link. In various embodiments, updating the set of permissible decompositions can include updating the demands associated with service links included in the selected decomposition. In some instances, these service links can become associated with the demand formerly satisfied by the selected service link. This new association with the demand formerly satisfied by the selected service link can increase the demand capacity for these service links. Accordingly, some of the remaining decompositions that include service links included in the decomposition of the selected service link may become invalid. Updating the set of permissible decompositions can include removing decompositions that violate capacity bounds based on the updated demands.

In step 511, the computing device may determine whether the set of permissible decompositions is empty. When the set of permissible decompositions is empty, the spanning set may be completely determined and method 500 can proceed to providing the spanning set in step 513. When the set of permissible decompositions is not empty, the computing device may return to step 503 and update the spanning set. To continue the prior example, service link $l_5$ now lacks a non-trivial decomposition (e.g., $DEC(l_5)=\{\{l_5\}\}$). In the next iteration of method 500, service link $l_5$ may be added to the spanning subset in step 503 and the trivial decomposition of service link $l_5$ may be removed from the set of permissible decompositions in step 505.

In step 513, the computing device can be configured to provide the spanning subset. Providing the spanning subset can include storing the spanning subset in a memory reachable by the computing device, displaying an indication of the spanning subset using a output device associated with the computing device (e.g., an image or text displayed on computer display or printed by a printer, or the like); providing an indication of the spanning subset to another computing device; or the like. In some embodiments, providing the spanning subset can include configuring communication network 100 to satisfy the demands using the service links in the spanning set. For example, the computing device can be configured to directly or indirectly provide instructions to signal handling devices implementing communication network 100 to configure these devices to handle the demands using the service links in the spanning subset. The computing device may further provide instructions, directly or indirectly, to tear down or otherwise terminate service links not included in the spanning subset.

Figure 6:
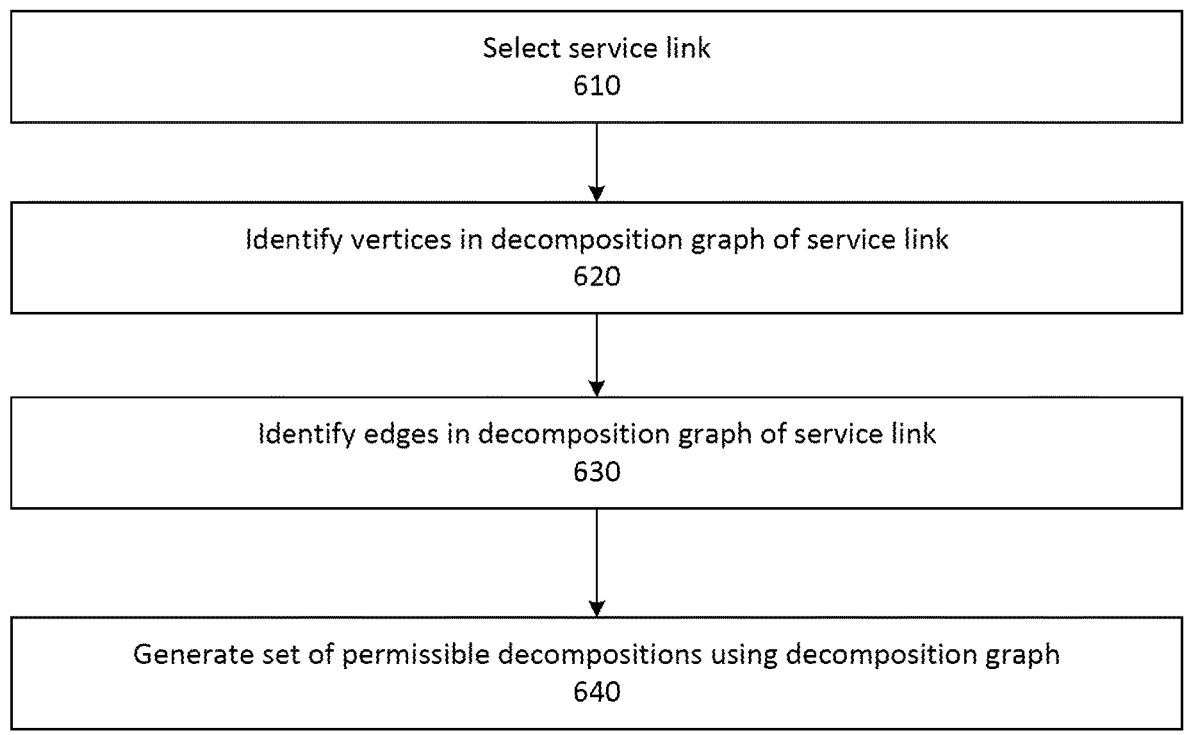
FIG. 6 depicts an exemplary method for generating decompositions of a service link, consistent with disclosed embodiments.
Figure 7:
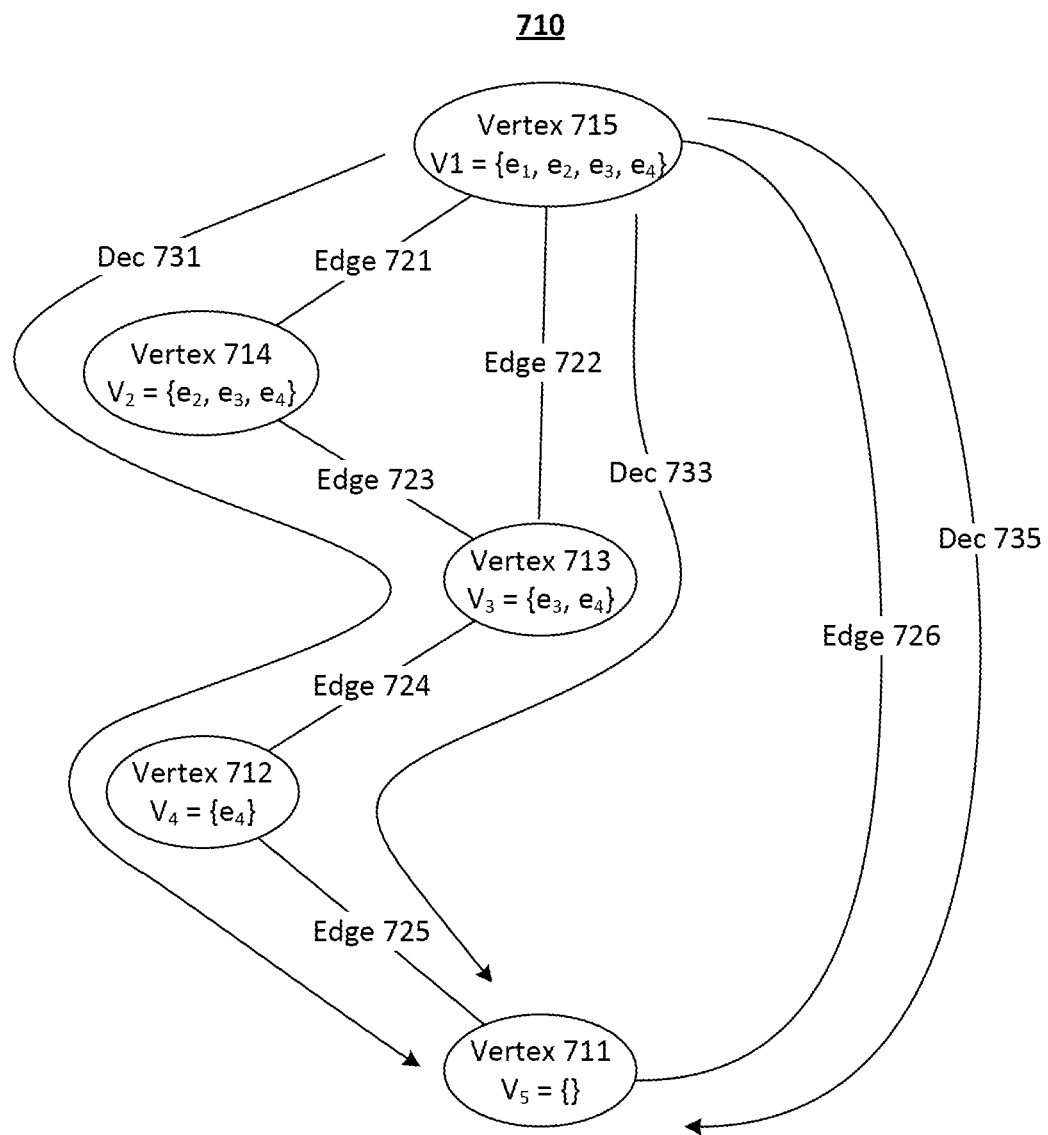
FIG. 7 depicts an exemplary decomposition graph for suitable for determining decompositions of a service link, consistent with disclosed embodiments.

FIGS. 6 and 7 depict a method 600 and associated decomposition graph 710 for generating decompositions of a service link, consistent with disclosed embodiments. In some embodiments, method 600 comprises selecting a service link of a network (e.g., $l_7$ of FIG. 4), generating a decomposition graph for the service link (e.g., decomposition graph 710) and traversing the decomposition graph to generate the set of all decompositions for the service link (e.g., the decomposition set $DEC(l_7)$ for service link $l_7$). By formulating generation of the decomposition set as traversal of a decomposition graph, a flow algorithm can be used to rapidly find multiple decompositions simultaneously. In some embodiments, the decompositions identified using the decomposition graph can be used to determine a spanning subset, according to the method of FIG. 5.

Method 600 can be performed by a computing device. The computing device of method 600 can be a physical device (e.g., a laptop, desktop, workstation, server, cluster, or the like) or a virtual device (e.g., a virtual machine, cloud computing environment, assortment of compute and memory resources, or the like). This computing device can be part of, or be co-located with, equipment implementing communication network 100. In various embodiments, the computing device 600 can be the same computing device described above with regards to method 500. In some embodiments, the computing device of method 600 can be distinct from the computing device of method 500. In such embodiments, the computing device of method 600 can be configured to directly provide or indirectly provide service link decompositions to the computing device of method 500. For example, the computing device of method 600 can be configured to store or otherwise provide service links decompositions to a resource commonly accessible to the computing devices of methods 500 and 600.

In step 610 of method 600, the computing device can be configured to select a service link from the set of service links associated with communications network 100. Selecting a service link can include obtaining information concerning the service link (e.g., path, capacity bounds, demands, demand capacities, or the like) from one or more devices implementing communications network 100. The computing device can be configured to select the service link randomly, or according to a criterion. For example, the computing device can be configured to select a service link based on the length of the path for the service link, the capacity bound of the service link, the demands or demand capacities associated with the service link, or the like.

In step 620, the computing device can be configured to identify vertices in a decomposition graph for the service link. The decomposition graph can be a directed graph with vertices V={V$_1$, . . . , V$_n$} and edges E={(V$_1$, V$_{j\in V\setminus V_1}$), . . . }. An exemplary decomposition graph 710 for service link l$_7$ of FIG. 4 is depicted in FIG. 7. In some instances, the vertices can represent paths through communication network 100. For example, where L={L$_1$, . . . , L$_k$} is the set of service links in the communication network 100, the service links having corresponding paths P={P$_1$, . . . , P$_k$}:

$$V_j = \{P_j | \exists P' \subset P \text{ and } P' \cdot P_j = P\}$$

Accordingly, a path P$_j$ in communication network 100 is a vertex in the decomposition graph of a service link when the path of the service link can be decomposed into a prefix and a suffix, the path P$_j$ being the suffix and the prefix being the concatenation of a subset P' of the paths in P. In some embodiments, the decomposition graph always includes the path of the decomposed service link, as the concatenation of the null path (as the prefix) and the path of the service link (as the suffix) always equals the path of the service link. In some embodiments, the decomposition graph always includes the null path, as the concatenation of the null path (as the suffix) and the path of the service link (as the prefix) always equals the path of the service link.

As depicted in FIG. 7, decomposition graph 710 includes vertex 715 (corresponding to the path of service link 17) and vertex 711 (corresponding to the null path). Decomposition graph 710 further includes vertex 712, with path P$_j$={e$_4$} and subset P'={e$_1$, e$_2$, e$_3$}; vertex 713, with path P$_j$={e$_3$, e$_4$} and subset P'={e$_1$, e$_2$}; and vertex 714, with path P$_j$={e$_2$, e$_3$, e$_4$} and subset P'={e$_1$}.

In step 630, the computing device can be configured to identify edges in the decomposition graph for the service link. In this non-limiting example, nodes are described as being found before edges. This ordering is not intended to be limiting. In some embodiments, for example, the decomposition graph can be built through an iterative process of adding nodes or edges. In some instances, the computing device can identify an edge as connecting a first vertex to a second vertex when a path associated with a service link in communication network 100 is the relative complement of the second vertex with respect to the first vertex. For example:

$$E = \{(V_i, V_j) | \exists l_k \in L \text{ with } P_k \in P : P_k \cdot P_j = P_i\}$$

In various embodiments, the computing device can further require that the service link satisfy a capacity bound criterion. For example, the computing device can require that the sum of the demand capacities for any demands associated with the identified service link and the service link being decomposed is less than the capacity bound for the identified service link. For example:

$$E = \{(V_i, V_j) | \exists l_k \in L : P_k \cdot P_j = P_i \text{ and } x_k + x_d \leq m_k\}$$

Where l$_k$ is a service link on communication network 100 associated with a demand d$_k$ having a demand capacity x$_k$, the service link l$_d$ for which the decomposition graph is being constructed is associated with a demand d having a demand capacity x$_d$, and the capacity bound of the service link l$_k$ is m$_k$.

In some embodiments, the decomposition graph always includes an edge connecting the vertex corresponding to the path of the service link being decomposed and the vertex corresponding to the null path, as the path of the service link being decomposed is the relative complement of these two vertices and the service link being decomposed is capable of satisfying its own demand.

As depicted in FIG. 7, decomposition graph 710 includes edge 726 that connects vertex 715 (corresponding to the path of the service link) to vertex 711 (corresponding to the null path). In this non-limiting example, the computing device can also determine that service link l$_1$ has a path {e$_1$} that is the relative complement of vertex 714 with respect to vertex 715. Furthermore, service link l$_1$ is associated with a demand d$_1$ having a demand capacity of 20 and service link l$_7$ (the service link being decomposed) is associated with a demand d$_7$ having a demand capacity of 60. The capacity bound of service link l$_1$ is 100. Accordingly, the computing device can identify edge 721 as a valid edge in decomposition graph 710. To continue this example, the computing device can further determine that service link l$_5$ has a path {e$_1$, e$_2$} that is the relative complement of vertex 713 with respect to vertex 715. Furthermore, service link l$_5$ is associated with a demand d$_5$ having a demand capacity of 40, while service link l$_7$ is associated with a demand d$_7$ having a demand capacity of 60. The capacity bound of service link l$_5$ is 100. Accordingly, the computing device can identify edge 722 as a valid edge in decomposition graph 710. In a similar manner, the computer device can identify edges 723, 724 and 725 as valid edges in decomposition graph 710.

The computing device can determine that no service link has a path that is the relative complement of vertex 712 with respect to vertex 714. Accordingly, the computing device can determine that no edge connects vertices 714 and 712. The computing device can also determine that no service link with a sufficiently large capacity bound connects vertices 713 and 711. Though service link 16 has a path {e$_2$, e$_3$} that is the relative complement of vertex 711 with respect to vertex 713, this service link lacks sufficient capacity to satisfy its own demand and the demand associated with service link 17. Service link l$_6$ is associated with demand d$_6$, which has a demand capacity of 60 and a capacity bound of 100. In this non-limiting example, the decomposed service link l$_7$ is associated with demand d$_7$, which has a demand capacity of 60. As the sum of the demand capacities for demands d$_6$ and d$_7$ (120) exceeds the capacity bound of service link l$_6$ (100), service link l$_6$ cannot support an edge connecting vertex 713 and vertex 711. As no other service link is the relative complement of vertex 711 with respect to vertex 713, the computing device can determine that no edge connects vertex 713 and vertex 711.

In step 640, the computing device can use the decomposition graph generated for a service link to generate a set of decompositions for that service link. The disclosed embodiments are not limited to a particular method of generating a set of decompositions from the decomposition graph. In some embodiments, the computing device can generate the set of decompositions by determining paths in the decomposition graph. To determine paths in the decomposition graph, the computing device can use a maximal flow algorithm to find a maximal number of edge disjoint paths. Alternatively or additionally, the computing device can use an iteratively use a shortest path algorithm (for example Dijkstra) to determine the shortest path, then exclude (remove) an edge on the shortest path from the graph. The computing device can continue to iterate (e.g., find shortest path, remove edge on shortest path) until a path cannot be found. These paths can start at the vertex corresponding to the decomposed service link (e.g., vertex 715 in FIG. 7) and can end at the vertex corresponding to the null path (e.g., vertex 711 in FIG. 7). As described herein, each of the edges in the decomposition graph is associated with a service link in communication network 100. The service links associated with the edges in a path from the vertex corresponding to the decomposed service link to the vertex corresponding to the null path form a valid decomposition of the service link. For example, the computing device can identify a path from vertex 715 to vertex 711 along DEC 731 in decomposition graph 710. The service links associated with this path are $l_1$ (associated with edge 721), $l_2$ (associated with edge 723), 13 (associated with edge 724), and 14 (associated with edge 725). Accordingly, the set $\{l_1, l_2, l_3, l_4\}$ forms a valid decomposition of $l_7$. As an additional example, the computing device can identify a path from vertex 715 to vertex 711 along DEC 733 in decomposition graph 710. The service links associated with this path are is (associated with edge 722), $l_3$, and $l_4$. Accordingly, the set $\{l_5, l_3, l_4\}$ forms a valid decomposition of $l_7$. As a further example, the computing device can identify a path from vertex 715 to vertex 711 along DEC 735 in decomposition graph 710. The service link associated with this path is $l_7$ (associated with edge 726). Accordingly, the set $\{l_7\}$ forms a valid decomposition of $l_7$ (the trivial decomposition). As Dec 731, Dec 733, and Dec 735 are the only paths through decomposition graph 710 from vertex 715 to vertex 711, the sets of service links associated with these sets of paths form the set of decompositions for $l_7$ (e.g., $DEC(l_7)=\{\{l_1, l_2, l_3, l_4\},\{l_5, l_3, l_4\}, \{l_7\}\}$).

Figure 8:
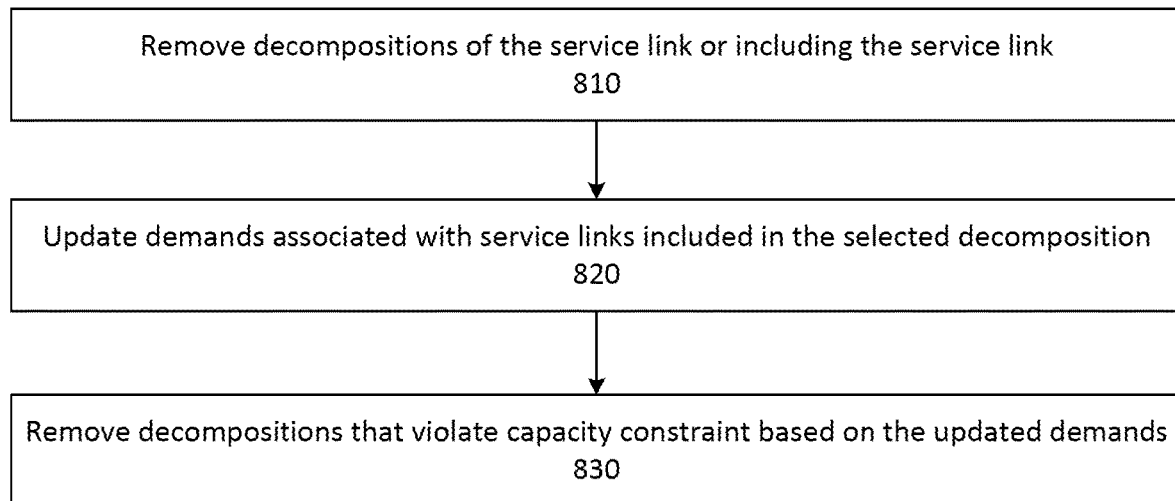
FIG. 8 depicts an exemplary method of updating a set of permissible decompositions, consistent with disclosed embodiments.

FIG. 8 depicts an exemplary method 800 of updating a set of permissible decompositions, consistent with disclosed embodiments. Method 800 can update the set of permissible decompositions in response to selection of a decomposition of a service link. For example, in some embodiments, method 800 can be performed as part of method 500. Method 800 can be performed by the same computing device as method 500, or another computing device. The computing device configured to perform method 800 can be separate or apart from, or co-located with, devices implementing communications network 100.

As described herein, in method 800, the computing device can select a decomposition (e.g., the "selected decomposition") of a service link (e.g. the "decomposed service link"). In step 810, the computing device can remove other decompositions of the decomposed service link, or other decompositions including the decomposed service link, from the set of permissible decompositions. In some embodiments, the computing device can remove all such decompositions from the set of permissible decompositions. To continue the example in FIG. 5, after selecting $dec(l_7)=\{l_1, l_2, l_3, l_4\}$, the computing device can remove from the set of permissible service links all other decompositions of service link $l_7$ or including service link $l_7$.

In step 820, the computing device can update the demands associated with the service links included in the selected decomposition. In some embodiments, updating these demands can include associating with these service links the demand(s) previously associated with the decomposed service link (the "decomposed service link demand(s)"). As the decomposed service link demand(s) have demand capacities, updating the update the demands associated with the service links will increase the demand capacities of these service links. To continue the example from FIG. 5, service link $l_7$ may be associated with a demand $d_7$ having a demand capacity $x_7$. In step 820, in response to selection of the decomposition of $l_7$ into service links $l_1$ to $l_4$, the computing device may associate demand $d_7$ with each of service links $l_1$ to $l_4$. Service links $l_1$ to $l_4$ may originally have demands $d_1$ to $d_4$ with demand capacities $x_1$ to $x_4$. Following association with demand $d_7$, service links $l_1$ to $l_4$ may have demands $\{d_1, d_7\}$ to $\{d_4, d_7\}$ and total demand capacities $x_1+x_7$ to $x_4+x_7$. The validity of this reallocation of demands follows from the definition of a decomposition.

In step 830, the computing device can be configured to remove decompositions that violate capacity constraints based on the updated demands. These other decompositions may include one or more of the service links included in the selected decomposition. The decomposed service link demand(s) associated with these service links may cause these other decompositions to become invalid. To continue the prior example, the set of permissible decompositions may also include:

$DEC(l_5)=\{\{l_1,l_2\},\{l_5\}\}$

Before, during, or after reallocating demand $d_7$ to service links $l_1$ and $l_2$, the computing device may determine that $dec(l_5)=\{l_1,l_2\}$ is no longer a valid decomposition of $l_5$. In some embodiments, as described herein, $dec(l_5)$ is a valid decomposition of $l_5$ when the sums of the demand capacities for the demands associated with each of $l_1$ and $l_2$ are less than capacity bounds for each of $l_1$ and $l_2$. However, following decomposition of service link $l_7$, the demand capacities associated with each of $l_1$ and $l_2$ have increased (e.g., from $x_1$ and $x_2$ to $x_1+x_7$ and $x_2+x_7$, respectively). Accordingly, the computing device may determine that reallocating demand $d_5$ to service links $l_1$ and $l_2$ is no longer be possible. The computing device may therefore remove $dec(l_5)=\{l_1, l_2\}$ from the set of permissible declarations. Accordingly, the set of all decompositions for service link $l_5$ may become:

$DEC(l_5)=\{\{l_5\}\}$

In this example, not only did decomposed service link demand $d_7$ cause $dec(l_5)=\{l_1,l_2\}$ to become invalid, the removal of $dec(l_5)=\{l_1,l_2\}$ from $DEC(l_5)$ caused service link $l_5$ to become a basic service link, as the only decomposition of $l_5$ remaining in $DEC(l_5)$ is the trivial decomposition.

Figure 9A:
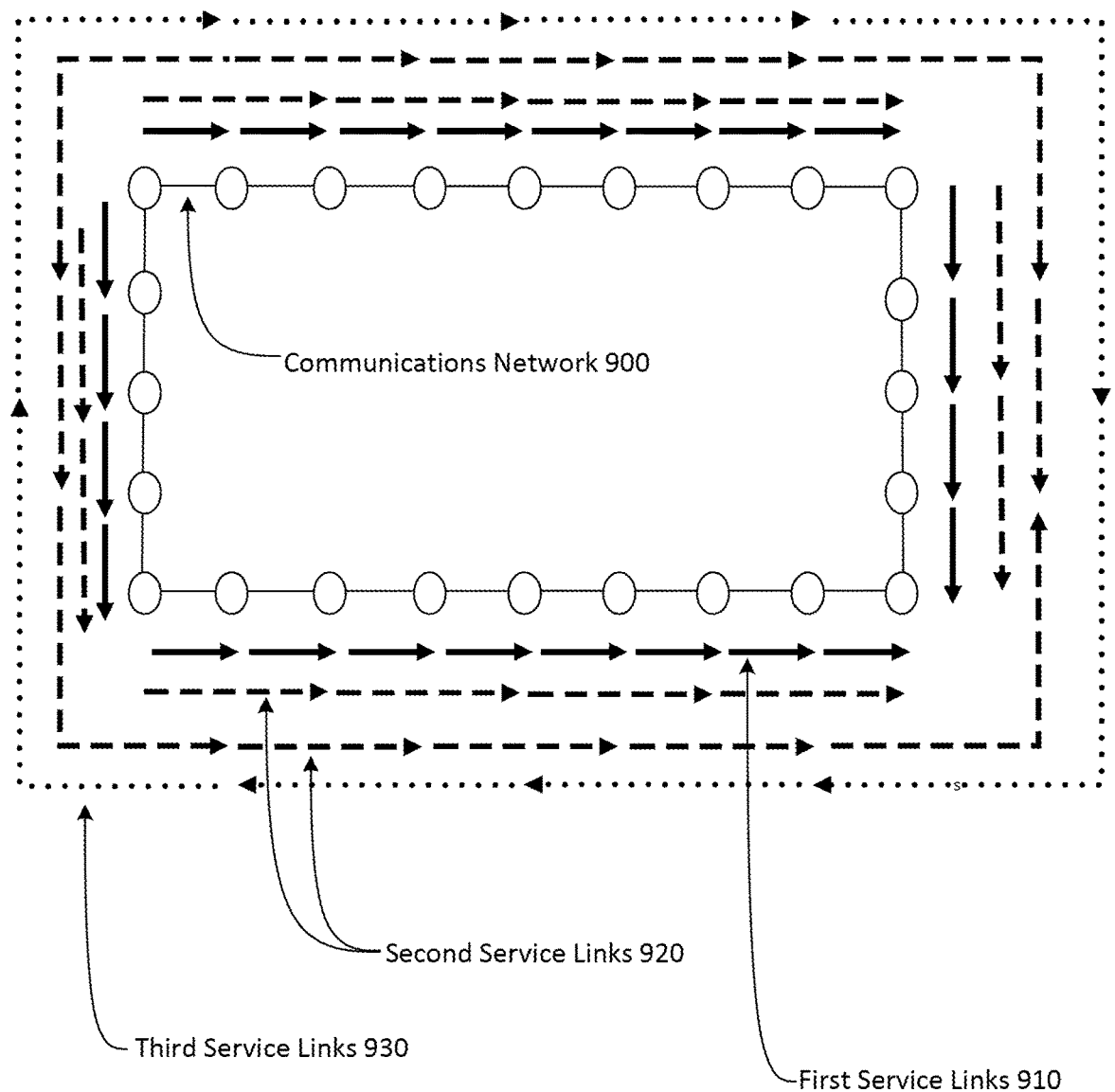
FIGS. 9A and 9B depict an exemplary determination of a spanning subset of service links for a communications network represented by an exemplary cycle graph, consistent with disclosed embodiments.
Figure 9B:
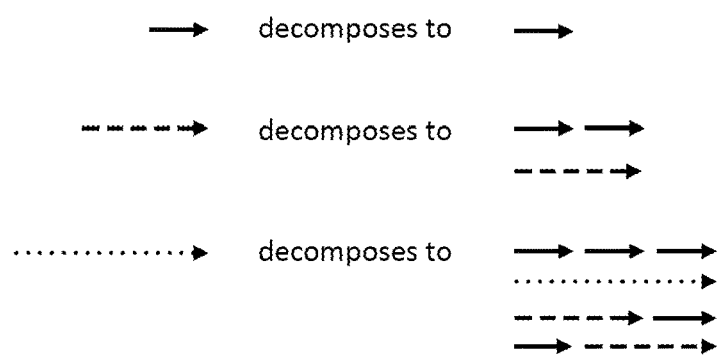

FIGS. 9A and 9B depicts determination of a spanning subset of service links for a communications network 900 (e.g., a communications network implemented similar to communications network 100) represented by an exemplary cycle graph, consistent with disclosed embodiments. Each of the service links depicted in FIGS. 9A and 9B can have a capacity bound of 100. FIG. 9A depicts a communications network 900 including 24 nodes this non-limiting example. Service links in a first group of service links each traverse a single edge to connect adjacent nodes in communications network 900 (e.g., first service links 910). The first group of service links can include 24 service links. These service links may each have a demand with a demand capacity of 50.

Service links in a second group of service links each traverse two edges (e.g., second service links 920). These service links can be arranged in two sub-sets. These service links can be staggered, with the service links in one subset originating at nodes skipped by the service links in the other sub-set. The second group of service links can include 24 service links. These service links may each have a demand with a demand capacity of 25.

Service links in a third group of service links each traverse three edges (e.g., third service links 930). The third group of service links can include 8 service links. These service links may each have a demand with a demand capacity of 50.

Consistent with method 500, a computing device can be configured to obtain decompositions of the service links in the first, second and third groups. FIG. 9B depicts these decompositions. The service links in the first group may have only the trivial decomposition. The service links in the second group may be decomposable into either a pair of service links in the first group or the trivial decomposition. The service links in the third group may be decomposable into a first pair of service links including one of the second group of service links concatenated with one of the first group of service links, a second pair of service links including one of the first group of service links concatenated with one of the second group of service links, or the trivial decomposition.

The computing device can determine that the initial set of basic service links includes first service links 910. The device can then determine that each of second service links 920 can be decomposed into service links in the set of basic service links (e.g., each of second service links 920 can be decomposed into two of first service links 910). Individually, or in a single iteration, the computing device can be configured to decompose the second service links into the first service links, as described above with regards to FIGS. 5 and 8. As each of the second service links 920 is decomposed, the decomposition of this service link and all of decompositions including this service link can be removed from the set of permissible decompositions. As can be appreciated from FIG. 9A, two service links in the second service links 920 will be decomposed into each of first service links 910. Accordingly, the demands associated with two of the second service links will be reassigned to each of first service links 910. This decomposition is valid, as the sum of demand capacities for all the demands associated with each of the second service links following reassignment (50+25+25) is still less than the capacity bounds of each of the first service links 910.

However, the computing device can determine (e.g., before, during, or after decomposing the second service links 920 into the first service links 910) that the non-trivial decompositions of each of the third service links 930 into pairs of one of the first service links 910 and one of the second service links 920 are no longer valid. As the first service links are now associated with total demand capacities of 100, the demands associated with the third service links 930 can no longer be assigned to the first service links 910 without violating the capacity bounds for these service links.

In some embodiments, the computing device can determine whether decomposing the third service links or decomposing the second service links results in a smaller spanning subset. The computing device can determine that decomposing each of the service links in the third service links 930 prevents decomposition of 4 service links in the second service links 920, as reassigning the demands for the one of the third service links 930 prevents any further decomposition of the corresponding second service link 920 (as it would now have a total demand capacity of 75) or corresponding first service link 910 (as it would now have a total demand capacity of 100). In constant, decomposing each of the service links in the second service links 920 prevents only the decomposition of one service link of third service links 930. Accordingly, the computing device can determine that decomposing the second service links 920 results in a smaller spanning subset and select these service links for decomposition.

In various embodiments, the computing device (or another computing device) can be configured to provide instructions to computing network 900 to satisfy the demands on the first, second, and third service links using only the first and third service links. In this manner, the computing device can reduce the number of service links used to satisfy the demands from 56 service links to 32 service links, thereby potentially improving the efficiency and flexibility of communications network 900.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

The embodiments may further be described using the following clauses:

1. A method for determining a spanning subset of service links for a communications network, comprising: obtaining a set of permissible service link decompositions for the communications network and a set of basic service links for the communications network; and generating the spanning subset, the generation including: selecting a decomposition of a first service link from the set of permissible service link decompositions; updating the set of permissible service link decompositions based on the selected decomposition; and updating the set of basic service links using the updated set of permissible service link decompositions.

2. The method of clause 1, wherein: selecting the decomposition of the first service link comprises: determining that the decomposition includes only service links in the set of basic service links; and selecting the decomposition in response to the determination.

3. The method of any one of clauses 1 to 2, wherein: the first service link is associated with a first demand; and updating the set of permissible service link decompositions based on the selected decomposition comprises: removing, from the set of permissible service link decompositions, decompositions of the first service link or including the first service link; updating demands associated with service links included in the selected decomposition using the first demand; and removing decompositions that, based on the updated demands, violate a capacity constraint.

4. The method of any one of clauses 1 to 2, wherein: updating the set of permissible service link decompositions comprises removing decompositions violating a capacity constraint from the set of permissible service link decompositions.

5. The method of any one of clauses 1 to 4, wherein: updating the set of basic service links using the updated set of permissible service link decompositions comprises: determining that the updated set of permissible service link decompositions lacks a non-trivial decomposition of a second service link; and adding the second service link to the set of basic service links in response to the determination.

6. The method of any one of clauses 1 to 4, wherein: the set of basic service links is updated to include ones of the service links lacking non-trivial decompositions in the updated set of permissible service link decompositions.

7. The method of any one of clauses 1 to 6, wherein: generation of the spanning subset further includes: updating the set of permissible service link decompositions based on the updated set of basic service links.

8. The method of any one of clauses 1 to 7, wherein: obtaining the set of permissible service link decompositions comprises: generating a set of permissible service link decompositions for each one of the service links, the generation comprising: selecting a subset of the service links based on a path of the each one of the service links and a first demand; generating a decomposition graph using the subset of the service links; and generating the set of permissible service link decompositions for the each one of the services links using the decomposition graph.

9. The method of any one of clauses 1 to 7, wherein: obtaining the set of permissible service link decompositions comprises generating and traversing a decomposition graph for each of the service links.

10. The method of any one of clauses 1 to 9, wherein: the method further comprises configuring the communications network to transmit network traffic using the spanning subset of service links.

11. A method for configuring a communications network, comprising: obtaining a set of permissible decompositions of a set of service links for the communications network; iteratively determining a spanning subset of the set of service links, an iteration comprising: updating the spanning subset of the set of service links based on the set of permissible service link decompositions; updating the set of permissible service link decompositions based on the spanning subset; selecting, from the set of permissible service link decompositions, a decomposition of a first service link; and updating the set of permissible service link decompositions using a first demand associated with the first service link; and configuring the communications network to transmit network traffic using the spanning subset of service links.

12. The method of clause 11, wherein: selecting the decomposition of the first service link comprises: determining that the decomposition consists of service links in the spanning subset; and selecting the decomposition, at least in part, in response to the determination.

13. The method of any one of clauses 11 to 12, wherein: selecting the decomposition of the service link further comprises: determining that no other decomposition consisting of service links in the spanning subset includes more service links than the selected decomposition.

14. The method of any one of clauses 11 to 13, wherein: updating the set of permissible service link decompositions based on the selected decomposition comprises: removing, from the set of permissible service link decompositions, decompositions of the first service link or including the first service link; updating demands associated with service links included in the selected decomposition using the first demand; and removing decompositions that, based on the updated demands, violate a capacity constraint.

15. The method of any one of clauses 11 to 13, wherein: updating the set of permissible service link decompositions comprises removing decompositions violating a capacity constraint from the set of permissible service link decompositions.

16. The method of any one of clauses 11 to 15, wherein: updating the spanning subset using the updated set of permissible service link decompositions comprises: determining that the updated set of permissible service link decompositions lacks a non-trivial decomposition of a second service link; and adding the second service link to the spanning subset in response to the determination.

17. The method of any one of clauses 11 to 15, wherein: the spanning subset is updated to consist of service links lacking non-trivial decompositions in the updated set of permissible service link decompositions.

18. The method of any one of clauses 11 to 17, wherein: obtaining the set of permissible service link decompositions comprises: generating a set of permissible service link decompositions for the first service link, the generation comprising: selecting a subset of the service links based on a path of the first service link and the first demand; generating a decomposition graph using the selected subset of the service links; and generating the set of permissible service link decompositions for the first service link using the decomposition graph.

19. The method of any one of clauses 11 to 17, wherein: obtaining the set of permissible service link decompositions comprises generating and traversing a decomposition graph for each of the service links.

20. The method of any one of clauses 11 to 19, wherein: the decomposition graph is traversed using a shortest path algorithm.

21. A method for configuring a communication network, comprising: determining a set of service links for a path in the communication network based on a set of demands for the path, the determination comprising: repeatedly selecting sets of service links for segments of the path, a repeat for a segment comprising: determining pair weights for path pairs, each path pair comprising: an initial portion of the segment, the initial portion being associated with a first set of service links and a first weight dependent on the first set; a complementary portion of the segment, the complementary portion being associated with a second set of service links and a second weight dependent on the second set; and wherein the pair weight for the each path pair depends on the first weight and the second weight; selecting a path pair for the segment based on the pair weight for the selected path pair; and selecting the first and second sets of service links for the selected path pair as the set of service links for the segment; and determining, when the segment comprises the path, the set of service links for the segment as the set of service links for the path; and configuring the communication network to service the set of demands for the path using the selected set of service links for the path.

22. The method of clause 21, wherein: repeatedly determining the sets of service links for the segments of the path comprises iteratively determining the sets of service links for progressively longer initial segments of the path.

23. The method of any one of clauses 21 to 22, wherein: the method further comprises: selecting the second set of service links based on: a metric value associated with the complementary portion of the segment and the set of demands; and transceiver data types specifying capacity bounds, metric value bounds, and weights for differing types of service links; and wherein the second weight further depends on the weights for the differing types of service links.

24. The method of clause 23, wherein: selection of the second set of service links is constrained by a requirement that each service link in the second set spans the complementary portion of the segment.

25. The method of any one of clauses 23 to 24, wherein: a greedy selection algorithm is used to select the second set of service links.

26. The method of any one of clauses 23 to 25, wherein: the second set of service links is selected to minimize the second weight.

27. The method of clause 23, wherein: selecting the second set of service links comprises solving an integer linear programming problem including constraints dependent on the set of demands, the capacity bounds, the metric value associated with the complementary portion of the segment, and the metric value bounds.

28. The method of any one of clauses 21 to 27, wherein: the initial portion was a segment in a prior repeat; and the first set of service links was the selected set of service links for the segment in the prior repeat.

29. The method of any one of clauses 21 to 28, wherein: each demand in the set of demands is associated with a subset of the service links, a union of the service links in the subset being associated with the each demand spanning the path; and each service link in the set of service links is associated with a subset of the demands, a sum of volumes of the demands in the subset associated with the each service link being less than a capacity bound of the each service link.

30. The method of any one of clauses 21 to 29, wherein: the path comprises a sequence of edges; and each segment of the path comprises a number of the initial edges in the sequence, the number incrementing with each repeat.

31. The method of any one of clauses 21 to 30, wherein: the path pair for the segment is selected to minimize a weight for the segment.

32. A method for determining a configuration of a communication network, comprising: obtaining, for a communication network comprising fiber optic cables connected by switches and transceiver-transponders, a representation of the communication network as a set of edges representing the fiber optic cables, the edges connected by nodes representing the switches and transceiver-transponders; and determining a set of service links for a path in the communication network based on a set of demands for the path, each service link representing data transmission by one of the transceiver-transponders through one or more of the fiber optic cables connected by zero or more of the switches, the determination comprising: iteratively selecting sets of service links for progressively longer initial segments of the path, an iteration for an initial segment comprising: determining pair weights for path pairs, each path pair comprising: an initial portion of the initial segment, the initial portion being associated with a first set of service links and a first weight dependent on the first set; a complementary portion of the initial segment, the complementary portion being associated with a second set of service links and a second weight dependent on the second set; and wherein the pair weight for the each path pair depends on the first weight and the second weight; selecting a path pair for the initial segment based on the pair weight for the selected path pair; and selecting the first and second sets of service links for the selected path pair as the set of service links for the initial segment; and determining, when the initial segment comprises the path, the set of service links for the initial segment as the set of service links for the path.

33. The method of clause 32, wherein: the path comprises a sequence of edges in the communication network; and each initial segment of the path comprises a number of the initial edges in the sequence, the number incrementing with each iteration.

34. The method of any one of clauses 32 to 33, wherein: the method further comprises:
selecting the second set of service links based on: a metric value associated with the complementary portion of the initial segment and the set of demands; and transceiver data types specifying capacity bounds, metric value bounds, and weights for differing types of service links; and wherein the second weight further depends on the weights for the differing types of service links.

35. The method of clause 34, wherein: selection of the second set of service links is constrained by a requirement that each service link in the second set span the complementary portion of the initial segment.

36. The method of any one of clauses 34 to 35, wherein: a greedy selection algorithm is used to select the second set of service links.

37. The method of any one of clauses 34 to 36, wherein: the second set of service links is selected to minimize the second weight.

38. The method of clause 34, wherein: selecting the second set of service links comprises solving an integer linear programming problem including constraints dependent on the set of demands, the capacity bounds, the metric value associated with the complementary portion of the initial segment, and the metric value bounds.

39. The method of any one of clauses 32 to 38, wherein: the initial portion was an initial segment in a prior repeat; and the first set of service links was the selected set of service links for the initial segment in the prior repeat.

40. The method of any one of clauses 32 to 39, wherein: each demand in the set of demands is associated with a subset of the service links, a union of the service links in the subset being associated with each demand spanning the path; and each service link in the set of service links is associated with a subset of the demands, a sum of volumes of the demands in the subset associated with each service link less being than a capacity bound of the each service link.

41. The method of any one of clauses 32 to 40, wherein: the method further comprises configuring the communication network to service the set of demands for the path using the selected set of service links for the path.

42. The method of any one of clauses 32 to 41, wherein: the path pair for the initial segment is selected to minimize a weight for the segment.

43. A method for determining a spanning set of service links for a communications network, comprising: obtaining a set of service links for a cycle graph representing a communications network, wherein the set of service links comprises: a first subset of first service links, each of the first service links traversing at most a first number of edges in the cycle graph and associated with one of first demands having a first demand capacity; a second subset of second service links, each of the second service links traversing at most a second number of edges in the cycle graph and associated with one of second demands having a second demand capacity; a third subset of third service links, each of the third service links traversing at least a third number of edges in the cycle graph and associated with one of third demands having a third demand capacity; and wherein a first capacity bound of the first service links is greater than or equal to the sum of the first demand capacity and two times the second demand capacity; wherein the first capacity bound of the first service links is greater than or equal to the sum of the first demand capacity and the third demand capacity; and wherein the first capacity bound of the first service links is less than the sum of the first demand capacity, the second demand capacity and the third demand capacity; determining a spanning subset of the service links containing the first and second service links; and configuring the communications network to satisfy the first, second, and third demands using the spanning subset of the service links.

44. A method for determining a spanning set of service links for a communications network, comprising: obtaining a graph including a first number of edges, the graph representing the communications network; obtaining transceiver data types including: a first transceiver data type with a first weight, wherein a service link configured to use the first transceiver data type is capable of: spanning one edge of the graph; and satisfying a set of demands on the communications network; a second transceiver data type with a second weight, wherein a service link configured to use the second transceiver data type is capable of: spanning two edges of the graph; and satisfying at most some of the demands in the set of demands; a third transceiver data type with a third weight, wherein a service link configured to use the third transceiver data type is capable of: spanning three edges of the graph; and satisfying one of the demands in the set of demands; selecting, based on the first weight, second weight, third weight, and first number of edges, service links that satisfy the demands, the selected service links including: a first number of service links having the second transceiver data type, the first number of service links equal to the first number of edges; a service link having the first transceiver data type and a second number of service links having the second transceiver data type, the second number of service links equal to the first number of edges minus one; four service links having the third transceiver data type and a third number of service links having the second transceiver data type, the third number of service links equal to the first number of edges minus three; a fourth number of service links having the third transceiver data type, the fourth number of service links equal to four thirds times the first number of edges; a service link having the first transceiver data type and a fifth number of service links having the third transceiver data type, the fifth number of service links equal to four thirds times the first number of edges minus one; or two service links having the second transceiver data type and a sixth number of service links having the third transceiver data type, the sixth number of service links equal to four thirds times the first number of edges minus two; and configuring the communications network to satisfy the set of demands using the selected service links.

44. A method for managing a communication network comprising at least one of determining a spanning subset of service links as recited in any one of clauses 1 to 10; configuring the communications network as recited in any one of clauses 11 to 20; configuring the communications network as recited in any one of clauses 21 to 31; or determining a configuration of the communications network as recited in any one of clauses 32 to 42.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A method for determining a spanning subset of service links for a communications network, comprising:
   obtaining, for service links associated with demands, a set of permissible service link decompositions; and
   iteratively determining a spanning subset of the service links capable of satisfying the demands, an iteration comprising:
   selecting, based on the spanning subset and from the set of permissible service link decompositions, a first service link decomposition of one of the service links,
   reallocating one of the demands based on the selection of the first service link decomposition, the one of the demands associated with the one of the service links,
   updating, based on the selection and reallocation, the set of permissible service link decompositions and the spanning subset; and
   wherein updating the spanning subset comprises including in the spanning subset another one of the service links that lacks a non-trivial decomposition in the updated set of permissible service link decompositions.

2. The method of claim 1, wherein:
   reallocating the one of the demands comprises allocating the one of the demands to service links included in the first service link decomposition.

3. The method of claim 1, wherein:
   the first service link decomposition consists of service links included in the spanning subset.

4. The method of claim 1, wherein:
   updating the set of permissible service link decompositions comprises:
   determining a second service link decomposition in the set of permissible service link decompositions is invalid, the determination based in part on a demand capacity associated with the second service link decomposition and the reallocation of the one of the demands; and
   removing the second service link decomposition from the set of permissible service link decompositions.

5. The method of claim 1, wherein:
   updating the set of permissible service link decompositions comprises:
   determining a second service link decomposition in the set of permissible service link decompositions includes the one of the service links; and
   removing the second service link decomposition from the set of permissible service link decompositions.

6. The method of claim 1, wherein:
   selecting the first service link decomposition comprises determining a number of potential removals associated with the selection of the first service link decomposition.

7. The method of claim 1, wherein:
   obtaining the set of permissible service link decompositions comprises:
   generating a decomposition graph; and
   generating the set of permissible service link decompositions using the decomposition graph.

8. The method of claim 7, wherein:
generating the set of permissible service link decompositions using the decomposition graph comprises traversing the decomposition graph for each of the service links.

9. The method of claim 1, wherein:
the method further comprises configuring the communications network to transmit network traffic using the spanning subset of service links.

10. A system, comprising:
at least one processor; and
at least one computer-readable medium containing instructions that, when executed by the at least one processor, cause the system to perform operations comprising:
obtaining, for service links for a communications network, the service links associated with demands, a set of permissible service link decompositions; and
iteratively determining a spanning subset of the service links capable of satisfying the demands, an iteration comprising:
selecting, based on the spanning subset and from the set of permissible service link decompositions, a first service link decomposition of one of the service links,
reallocating one of the demands based on the selection of the first service link decomposition, the one of the demands associated with the one of the service links,
updating, based on the selection and reallocation, the set of permissible service link decompositions and the spanning subset; and
wherein updating the spanning subset comprises including in the spanning subset another one of the service links that lacks a non-trivial decomposition in the updated set of permissible service link decompositions.

11. The system of claim 10, wherein:
reallocating the one of the demands comprises allocating the one of the demands to service links included in the first service link decomposition.

12. The system of claim 10, wherein:
the first service link decomposition consists of service links included in the spanning subset.

13. The system of claim 10, wherein:
updating the set of permissible service link decompositions comprises:
determining a second service link decomposition in the set of permissible service link decompositions is invalid, the determination based in part on a demand capacity associated with the second service link decomposition and the reallocation of the one of the demands; and
removing the second service link decomposition from the set of permissible service link decompositions.

14. The system of claim 10, wherein:
updating the set of permissible service link decompositions comprises:
determining a second service link decomposition in the set of permissible service link decompositions includes the one of the service links; and
removing the second service link decomposition from the set of permissible service link decompositions.

15. The system of claim 10, wherein:
selecting the first service link decomposition comprises determining a number of potential removals associated with the selection of the first service link decomposition.

16. The system of claim 10, wherein:
obtaining the set of permissible service link decompositions comprises:
generating a decomposition graph; and
generating the set of permissible service link decompositions using the decomposition graph.

17. The system of claim 16, wherein:
generating the set of permissible service link decompositions using the decomposition graph comprises traversing the decomposition graph for each of the service links.

18. The system of claim 10, wherein:
the operations further comprises configuring the communications network to transmit network traffic using the spanning subset of the service links.

* * * * *